United States Patent
Mirahadi et al.

(10) Patent No.: US 12,493,856 B2
(45) Date of Patent: Dec. 9, 2025

(54) COMPUTING SYSTEM AND METHOD FOR GENERATING PREDICTIVE HEAT MAPS FOR TARGET STATUS DIMENSIONS WITH DATA-DRIVEN RECOMMENDATIONS

(71) Applicant: Procore Technologies, Inc., Carpinteria, CA (US)

(72) Inventors: Farid Mirahadi, North York (CA); Matt Man, Thornhill (CA); Mohammad Mostafa Soltani, Toronto (CA); William Gaines, Pasadena, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 18/671,985

(22) Filed: May 22, 2024

(65) Prior Publication Data

US 2025/0363456 A1 Nov. 27, 2025

(51) Int. Cl.
*G06Q 10/10* (2023.01)
*G06F 9/451* (2018.01)
*G06Q 50/08* (2012.01)

(52) U.S. Cl.
CPC ........... *G06Q 10/103* (2013.01); *G06F 9/451* (2018.02); *G06Q 50/08* (2013.01)

(58) Field of Classification Search
CPC ....... G06Q 10/103; G06Q 50/08; G06F 9/451
USPC ....................................................... 705/301
See application file for complete search history.

(56) References Cited

U.S. PATENT DOCUMENTS

| | | | | |
|---|---|---|---|---|
| 2022/0156857 | A1* | 5/2022 | Hudelson | G06Q 50/08 |
| 2024/0419655 | A1* | 12/2024 | Taylor | G06F 16/2365 |
| 2025/0045846 | A1* | 2/2025 | Strickling | G06V 10/70 |

OTHER PUBLICATIONS

Shanaka Kristombu Baduge, Artificial intelligence and smart vision for building and construction 4.0: Machine and deep learning methods and applications, 2022 (Year: 2022).*
Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

*Primary Examiner* — Tarek Elchanti
(74) *Attorney, Agent, or Firm* — Lee Sullivan Shea & Smith LLP

(57) ABSTRACT

An example computing platform is configured to: determine, via a first machine-learning model, a relationship between a data asset associated with a construction project and a first location entity associated with the construction project; update the data asset to include an indication of the relationship; receive an indication of a target status dimension and a request to generate a heat map for the construction project; determine, for the first location entity, a first value for the target status dimension based the relationship; generate data indicating the heat map, the heat map comprising a visual representation of the first location entity displayed in a first color along a color scale that represents the first value for the target status dimension; and transmit, to an end-user device, the data indicating the heat map and thereby cause the heat map to be displayed via the second end-user device.

17 Claims, 7 Drawing Sheets

COMPUTING SYSTEM AND METHOD FOR GENERATING PREDICTIVE HEAT MAPS FOR TARGET STATUS DIMENSIONS WITH DATA-DRIVEN RECOMMENDATIONS

BACKGROUND

Increasingly, parties involved in construction projects are beginning to use advanced software applications to manage those construction projects. One example of such an advanced software application is the software-as-a-service (SaaS) application for construction management offered by Procore Technologies, Inc. ("Procore"), who is the current applicant. Using construction management software applications such as these, parties can create a digital representation of each construction project that is to be managed and then create and store various types of project data in association with those digital project representations. Such project data may include specifications, drawings, or the like, which may be uploaded to the digital project representation, as well as various other types of data assets that may be created within the construction management software application.

OVERVIEW

Disclosed herein is a new software technology for generating a heat map for a construction project based on a target status dimension and one or more visual scales (e.g., a color scale) such that the visual appearance (e.g., color) of a given location entity depicted in the heat map indicates a corresponding one or more values for the target status dimension for the location entity. The technology described in accordance with the present disclosure may take any of various forms.

In one aspect, the disclosed technology may take the form of a method to be carried out by a computing platform that involves (i) receiving, from a first end-user device, a data asset related to a construction project; (ii) extracting, from the data asset, one or more feature values for one or more respective feature variables; (iii) determining, via a first machine-learning model based on the plurality of feature values, a first relationship between the data asset and a first location entity associated with the construction project; (iv) updating the data asset to include an indication of the first relationship between the data asset and the first location entity; (v) receiving, from a second end-user device, (A) an indication of a target status dimension and (B) a request to generate a heat map for the construction project that represents values for the target status dimension along a color scale; (vi) determining, for the first location entity, a first value for the target status dimension based on (A) the one or more feature values and (B) the first relationship between the data asset and the first location entity; (vii) generating data indicating the heat map for the construction project, the heat map comprising a visual representation of the first location entity displayed in a first color along the color scale that represents the first value for the target status dimension; and (viii) transmitting, to the second end-user device, the data indicating the heat map and thereby causing the heat map to be displayed via the second end-user device.

In some examples, the method further involves (i) determining, via the first machine-learning model based on the plurality of feature values, a second relationship between the data asset and a second location entity associated with the construction project; (ii) updating the data asset to include an indication of the second relationship between the data asset and the second location entity; and (iii) determining, for the second location entity, a second value for the target status dimension based on (A) the one or more feature values and (B) the second relationship between the data asset and the second location entity, wherein the heat map further comprises a visual representation of the second location entity displayed in a second color along the color scale.

Further, in some examples, the method further involves (i) determining, based on a position of the first location entity within a hierarchical taxonomy of location entities associated with the construction project, that the first location entity is located within a second location entity associated with the construction project; (ii) based on determining that the first location entity is located within the second location entity, determining a second relationship between the data asset and the second location entity; and (iii) updating the data asset to include an indication of the second relationship between the data asset and the second location entity.

Still further, in some examples, the data asset is a first data asset, and determining, for the first location entity, the first value for the target status dimension comprises determining, for the first location entity, the first value for the target status dimension based on an association between the first data asset and a second data asset.

Still further, in some examples, the first data asset is a daily activity log indicating an installation status of a given material, the target status dimension is a construction schedule status, the first location entity is a given room that includes the given material, the second data asset is a construction schedule indicating a scheduled installation date of the given material, and the first value for the target status dimension indicates whether installation of the given material in the given room is on schedule.

Still further, in some examples, the method further involves (i) identifying, based the first value for the target status dimension, at least one of a schedule risk or a budget risk related to the construction project; (ii) generating a notification indicating the schedule risk or budget risk; and (iii) transmitting, to the second end-user device, the notification and thereby causing the notification to be displayed via the second end-user device.

Still further, in some examples, the method further involves (i) determining, via a second machine-learning model, a recommended action to be taken based on the first value for the target status dimension; (ii) generating a notification indicating the recommended action; and (iii) transmitting, to the second end-user device, the notification and thereby causing the notification to be displayed via the second end-user device.

Still further, in some examples, the data asset is an informational data asset comprising: a request for information, a punch list, a daily log, a change order, an inspection report, a budget, or a schedule for the construction project.

In yet another aspect, disclosed herein is a computing platform that includes at least one communication interface, at least one processor, at least one non-transitory computer-readable medium, and program instructions stored on the at least one non-transitory computer-readable medium that, when executed by the at least one processor, cause the computing platform to carry out the functions disclosed herein, including (but not limited to) any of the functions of the foregoing methods.

In yet another aspect, disclosed herein is a non-transitory computer-readable medium provisioned with program instructions that, when executed by at least one processor, cause a computing platform to carry out the functions disclosed herein, including (but not limited to) any of the functions of the foregoing methods.

One of ordinary skill in the art will appreciate these as well as numerous other aspects in reading the following disclosure.

DETAILED DESCRIPTION

Figure 1:
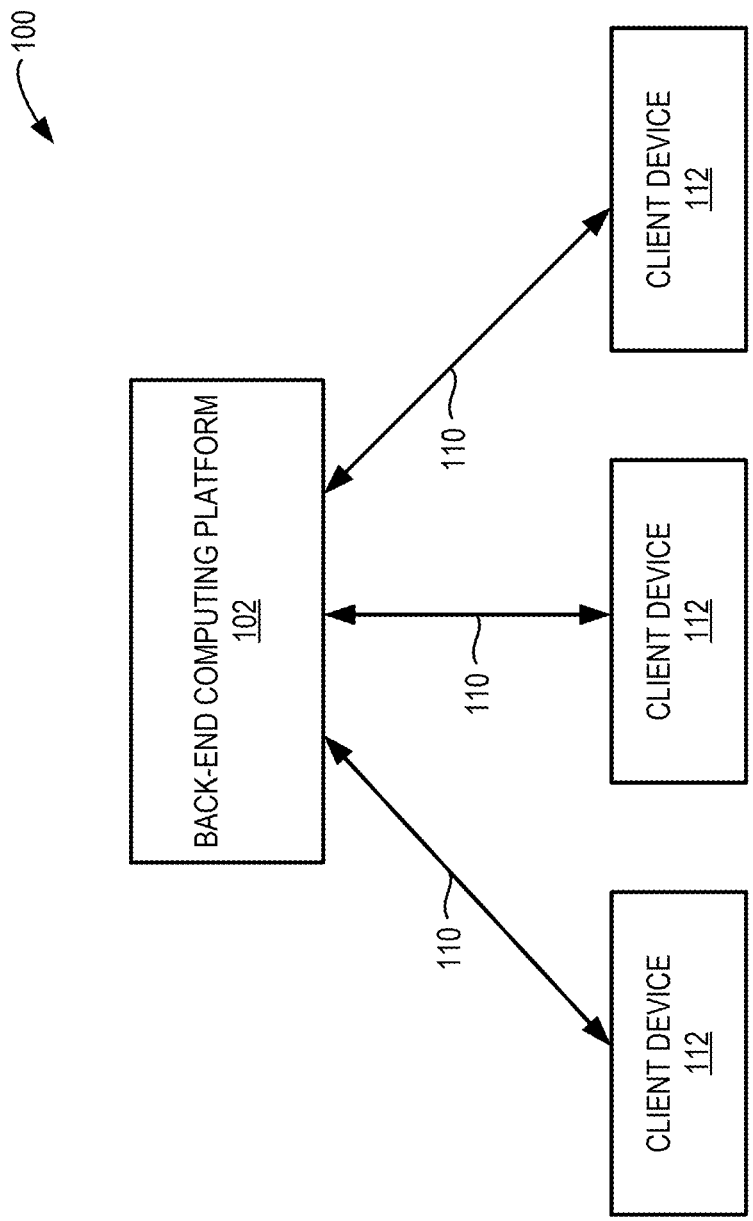
FIG. 1 depicts an example network configuration in which examples described herein may be implemented.

The following disclosure refers to the accompanying figures and several examples. A person of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

A construction project often involves the creation of an immense amount of information, involving a large number of different stakeholders that may be creators or consumers—often both—of such information. At the inception of a construction project an owner may coordinate with planners, architects, and engineers in a planning and design phase to define the scope and develop the design for the project (e.g., a new building). This phase may take months or years depending on the size of the project, and may result in the creation of project-specific design specifications, architectural plans, engineering plans, etc. These various different plans generally comprise visual representations of the construction project that visually communicate information about the construction project, such as how to assemble or construct different parts of the project. Such visual representations tend to take one of at least two different forms. One form may be a two-dimensional technical drawing in which two-dimensional line segments of the drawing represent certain physical elements of the construction project like walls and ducts. In this respect, a two-dimensional technical drawing could be embodied either in paper form or in a computerized form, such as an image file (e.g., a PDF, JPEG, etc.), or via software for viewing a two-dimensional drawing model.

As another possibility, a construction project's design plans may be represented by a three-dimensional model that is embodied in a computerized form, such as in a building information model (BIM) file, with three-dimensional meshes visually representing the physical elements of the construction project (e.g., walls, ducts, etc.). Specialized software is configured to edit and access the BIM file and render a three-dimensional view of the construction project from one or more perspectives.

Following the planning and design phase, a preconstruction phase may introduce additional stakeholders such as project managers, general contractors, and subcontractors, each of whom may work with estimators to prepare cost estimates for the project in order to prepare corresponding bids (e.g., bids to perform work on a certain portion of the project). In turn, the owner may award contracts to construction the project, and these contracts may contain additional terms and expectations regarding the project's construction, including a project budget and contingencies.

Thereafter, the construction managers and/or contractors may generate still further information for the project, including additional bidding and selection of subcontractors within different trades (e.g., concrete, masonry, carpentry, plumbing, etc.), risk management plans, safety plans, and a work breakdown structure, which is a listing of activities (e.g., pouring a foundation, installing a door, etc.) and the tasks involved in completing each activity. In this regard, a typical construction project may include thousands of such activities that may have to be broken down in order to create a clear roadmap for the construction process.

Relatedly, a scheduler may develop a project schedule that specifies an order for the activities in the work breakdown structure and establishes the timing of construction. For instance, a project schedule may establish a critical path of activities that dictates the longest time to project completion, may identify activities that can be performed in parallel, and may include milestones for certain activities to assist project managers with assessing whether a project is on schedule.

The construction phase (i.e., the execution phase) may follow. During this phase, contractors and subcontractors order and take delivery of materials, update their individual budgets, establish labor management plans and monthly, weekly, or daily schedules, and generally construct the project. Once construction is underway, a project manager or general contractor may track (e.g., in daily logs) the work that is performed in relation to the project schedule, as well as the quality of the work that is performed in relation to the design specifications. Further, the project manager or general contractor may track the project budget as construction progresses.

In addition to the information discussed above that is continually being generated throughout the construction phase, changes will occur in any given construction project. For example, construction materials may suffer from shortages or delivery delays or the weather may prevent some work from being completed when planned, or an object may be installed incorrectly requiring it to be removed and reinstalled, leading to updates to the project schedule. As another possibility, the architectural or engineering drawings may be revised to account for unforeseen field conditions, to correct a design error, or to incorporate an owner-directed change. In these situations, a change order may be generated, submitted to one or more stakeholders for approval and analysis (e.g., to determine the impact to the project budget and/or schedule). Once the change order is approved, a drawing revision may be issued and the two-dimensional technical drawings and/or three-dimensional model may be updated accordingly, or a sketch may be provided in lieu of updating the drawings. Similarly, the project budget may be updated to reflect the approved change order, and a revised schedule may be developed. In other situations, a change order might affect some aspects of the construction project but not others—e.g., a change order might impact the schedule without affecting the drawings or the budget.

In some cases, a given change to a project during construction may have a cascading effect, not only due to the direct impacts the change might have on the budget or schedule, but also due to the indirect impacts that may arise. For example, a change to the size or location of a piece of mechanical equipment within a building may compel a change to a wall configuration, which in turn may compel repositioning of electrical conduit that was designed to be placed within the walls, and so on. At the construction stage, each of these changes may affect a different subcontractor's scope of work, budget, and schedule. Furthermore, each of these changes may be incorporated into the overall project budget and schedule. Accordingly, accounting for changes can generate still further information during the course of a construction project. In general, coordinating, tracking, and recording information related to changes involves a substantial amount of time and effort among the various stakeholders, and can be a considerable challenge.

Another common source of information during construction are requests for information (RFIs) that are generated by one of the stakeholders involved in construction. RFIs are used to clarify ambiguities, answer questions, and fill information gaps that occur during the construction process, sometimes resulting in change orders. A typical scenario for creating an RFI is when a subcontractor or superintendent requests specific information from the project's architect or engineer to complete an activity or task. For example, a project drawing might be unclear, an applicable regulation may be vague, a product specification might be outdated, inaccurate, or incomplete, or a field-driven change order may compel additional input from the architect or engineer. In such cases, an RFI is generated and responsibility for answering the RFI is assigned.

Once the RFI is answered, the response to the RFI is recorded. A given construction project might generate hundreds of RFIs, some of which may result in change orders. Accordingly, tracking outstanding RFIs is instrumental for preventing miscommunication, project delays, and/or rework.

Near the end of the construction phase, punch lists are generally created to list the items on the project that are to be corrected or otherwise completed before the project is closed out. A given punch list item might be assigned to, and compel a response from, any of the subcontractors who performed work on the project. In many cases, applicable law mandates that final inspections and certifications be carried out for various systems and equipment within the project.

Eventually, the construction phase is completed and the project moves to a closeout phase, where the owner takes control of the project. Typically, this involves the handover of a substantial amount of information from the stakeholders involved in the construction phase to the owner regarding the finished state of the project. For instance, this information may include as-built drawings, RFIs and change orders created during construction and their resolution, punch list details, final inspection records, etc. As detailed above, this universe of information can be substantial.

It should be understood that the brief description of a typical construction project above represents one possible example and discusses only some of the many different sources of information that may exist for a given project.

Today, the construction industry as a whole suffers from various inefficiencies related to this vast amount of information associated with a given construction project. For example, even though the majority of information associated with a given construction project is associated with one or more specific locations, there is currently not a visual way to convey meaningful and/or actionable insights about how the information related to a specific location influences construction project status for a metric of interest (e.g., a target dimension such as installation status, schedule status, budget status, etc.) for that specific location. The challenge of tracking down information related to the specific location is likely to be substantial on its own, as information related to the specific location may be stored in disparate data siloes, each of which may index data in a different way such that a different search query and/or different searching parameters may have to be used to search through different data silos. Furthermore, even if the information related to the specific location is somehow collected successfully, the manner in which that information influences a particular metric for the specific location may not be immediately clear. Furthermore, at any given time when a user (e.g., a stakeholder) collects information about the specific location, most of the information is unlikely to be relevant to a specific question or concern that the user is seeking to answer in the moment. As a result, a user may be left trying to find the needle of information that is relevant to the specific question or concern in a haystack of information that relates to the particular location, but is not relevant to the specific question. Oftentimes, the specific question may be focused on a particular metric of interest, such as whether a particular task will be completed on time or how a budget may be affected by a recent change. For example, at any given time, a stakeholder may wish to identify areas from which schedule-related or budget-related problems are originating quickly and intuitively without having to inspect a thicket of related data assets manually. Furthermore, shortly after a new data asset has been created (e.g., a change order, a punch list, or a daily log), a stakeholder wish for any change that the new data asset causes with respect to the metric of interest in the identified area to be reflected dynamically in an intuitive visual format. However, there are currently no tools that provide this functionality for construction projects.

To address these and other problems with existing technology that is used for the management of construction project information, disclosed herein is new software technology that determines relationships between data assets and locations associated with a construction project, leverages those relationships to determine location-specific values for a target status dimension, and generates a heat map that utilizes a color scale such that the color of a given location depicted in the heat map indicates a corresponding value of the target status dimension for the location. The heat map allows a stakeholder to perceive the net effect of a large amount of information (e.g., that may be spread across many different data assets) pertinent to any particular metric that is of interest to the stakeholder at any given time, even if the complexity of the relationship between the information and the metric of interest is high (e.g., not comprehensible, as a practical matter, in the human mind). Moreover, the stakeholder can perceive this information in an intuitive visual format that is mapped onto the corresponding location(s) within the construction project to which the information relates (e.g., mapped onto a 2D drawing such as a plan view or an elevation view, mapped onto a perspective view, a 3D model, etc. of the construction project). In addition, the software technology disclosed provides functionality that can update the heat map dynamically as new data assets are added to the construction project. Further, in some examples, the software technology can preemptively detect specific risks and provide targeted recommendations based on the data assets and the determined relationships.

Heat maps generated by the technology disclosed herein provide a new and useful paradigm through which users can interact with project information and data. Instead of searching through folders, documents, and text manually, users can leverage heat maps and other visual elements described herein to perceive the collective meaning of the information found in such folders, documents, and text, to understand project statuses, detect risks, and to obtain actionable insights quickly.

In line with the discussion above, the disclosed technology may be implemented as one or more software applications that facilitate the creation and management of data during the course of a construction project, some examples of which may include the types of software applications developed by Procore Technologies. Further, in practice, the computing platform in which the disclosed technology is incorporated may take the form of a software as a service ("SaaS") application that comprises a front-end software component running on a user's client station and a back-end software component running on a back-end computing platform that is accessible to the user client station via a communication network such as the Internet.

In practice, the disclosed software technology may either be integrated into a construction management software application or provided as a standalone software tool, among other possibilities. For instance, as one possible implementation, the disclosed software technology may be integrated into a construction management software application comprising both front-end client software running on client devices that are accessible to individuals associated with construction projects (e.g., contractors, project managers, architects, engineers, designers, etc.) and back-end software running on a back-end computing platform (sometimes referred to as a "cloud" platform) that interacts with and/or drives the front-end software. As another possible implementation, the disclosed software technology may be integrated into a construction management software application comprising front-end client software that runs on client devices without interaction with a back-end platform. These software applications may take other forms as well.

Turning now to the figures, FIG. 1 depicts an example network configuration 100 in which examples of the present disclosure may be implemented in connection with a construction management software application. As shown in FIG. 1, the network configuration 100 includes a back-end computing platform 102 that may be communicatively coupled to one or more client devices 112. Although the client devices 112 are depicted by three stations as shown for the sake of simplicity in illustration, it should be understood that the client devices 112 may represent more or less than three stations without departing from the spirit and scope of this disclosure.

Broadly speaking, the back-end computing platform 102 may comprise one or more computing systems that have been provisioned with back-end software for a construction management software application, which may include program code for carrying out one or more of the platform-side functions disclosed herein. The one or more computing systems of back-end computing platform 102 may take various forms and may be arranged in various manners.

For instance, as one possibility, the back-end computing platform 102 may comprise computing infrastructure of a public, private, and/or hybrid cloud (e.g., computing and/or storage clusters) that has been provisioned with software for carrying out one or more of the functions disclosed herein. In this respect, the entity that owns and operates the back-end computing platform 102 may supply its own cloud infrastructure or obtain the cloud infrastructure from a third-party provider of "on demand" computing resources, such as Amazon Web Services (AWS) or the like. As another possibility, the back-end computing platform 102 may comprise one or more dedicated servers that have been provisioned with software for carrying out one or more of the functions disclosed herein. Other implementations of the back-end computing platform 102 are possible as well.

In turn, the client devices 112 may each be any computing system that is capable of running front-end software for a construction management software application, which may include program code for carrying out the client-side functions disclosed herein. In this respect, the client devices 112 may each include hardware components such as a processor, data storage, a user interface, and a network interface, among others, as well as software components that facilitate the client device's ability to run the front-end software disclosed herein (e.g., operating system software, web browser software, etc.). As representative examples, the client devices 112 may each take the form of a desktop computer, a laptop, a netbook, a tablet, a smartphone, and/or a personal digital assistant (PDA), among other possibilities.

As further depicted in FIG. 1, the back-end computing platform 102 is configured to interact with the client devices 112 over respective communication paths 110. In this respect, each communication path 110 between the back-end computing platform 102 and one of the client devices 112 may generally comprise one or more communication networks and/or communications links, which may take any of various forms. For instance, each respective communication path 110 with the back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 110 with the back-end computing platform 102 may be wireless, wired, or some combination thereof, and may carry data according to any of various different communication protocols. Although not shown, the respective communication paths 110 between the client devices 112 and the back-end computing platform 102 may also include one or more intermediate systems. For example, it is possible that the back-end computing platform 102 may communicate with a given client devices 112 via one or more intermediary systems, such as a host server (not shown). Many other configurations are also possible.

Although not shown in FIG. 1, the back-end computing platform 102 may also be configured to receive data, such as data related to a construction project, from one or more external data sources, such as an external database and/or another back-end computing platform or platforms. Such data sources—and the data output by such data sources—may take various forms.

It should be understood that the network configuration 100 depicted in FIG. 1 is one example of a network configuration in which examples described herein may be implemented. Numerous other arrangements are possible and contemplated herein. For instance, other network configurations may include additional components not pictured and/or more or fewer of the pictured components.

As will be discussed in greater detail below, the back-end computing platform 102 may be configured to execute functionality for generating a heat map for a construction project based on a target status dimension and a color scale (e.g., that maps possible values of the target status dimension to respective colors and/or patterns) such that the color of a given location entity (e.g., a room, a hallway, etc.) depicted in the heat map indicates a corresponding value of the target status dimension for the location entity. Furthermore, the back-end computing platform 102 may execute functionality for predicting risks indicated by the respective corresponding values of the target status dimension for the location entities, suggesting actions to be taken (e.g., in response to the predicted risks), and determining an order in which notifications of such risks and/or suggested actions are to be presented.

Figure 2:
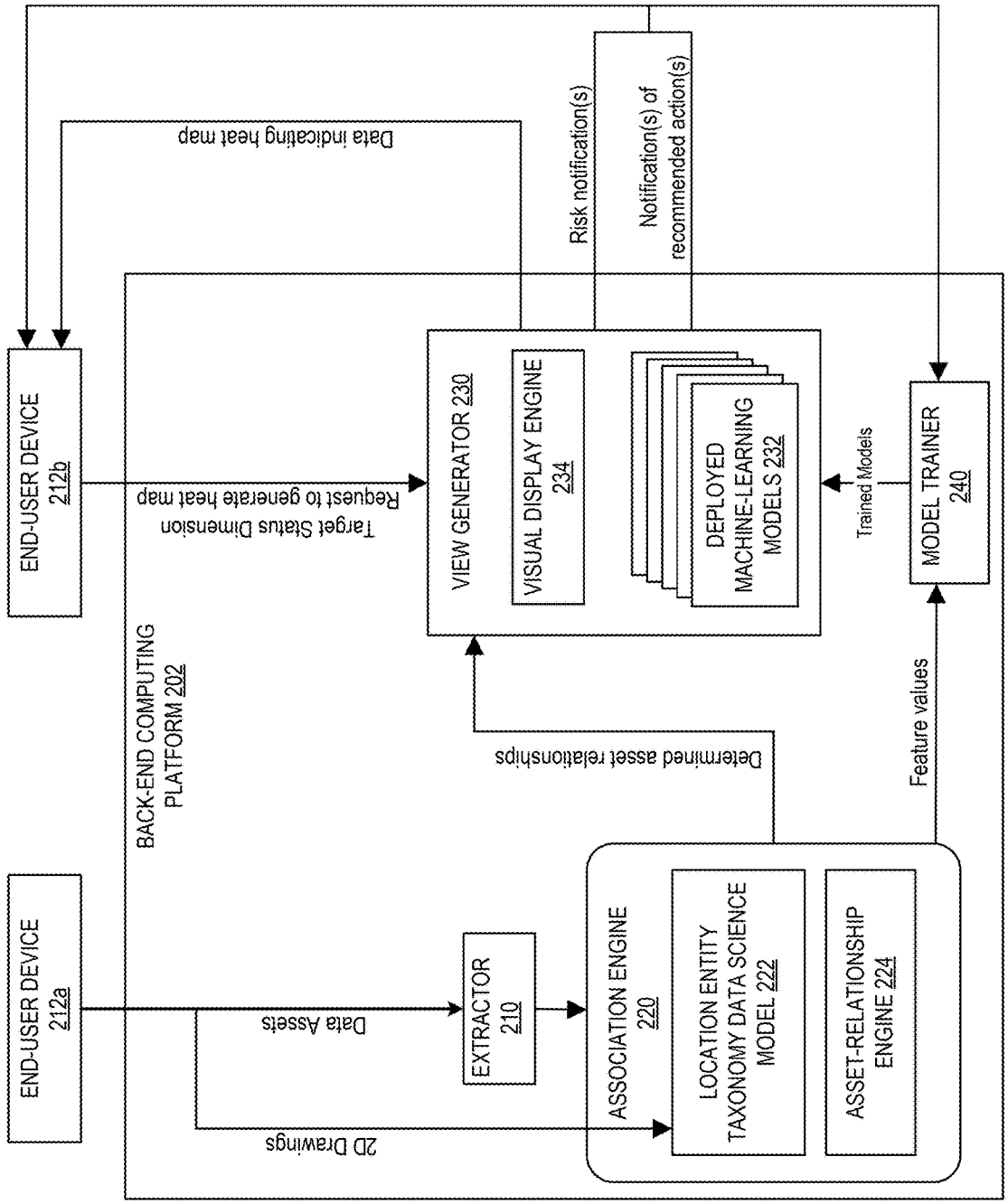
FIG. 2 depicts a conceptual illustration of one example of a heat-map-generation pipeline for generating a heat map for a construction project.

Turning to FIG. 2, a conceptual illustration of one example of a heat-map-generation pipeline 200 for generating a heat map for a construction project is shown. The heat-map-generation pipeline may be utilized to generate a heat map on a visual representation of the construction project (e.g., on a 2D view of the project), where the heat map represents values for a target status dimension for the construction project along a color scale in accordance with the present disclosure. As shown in FIG. 2, the heat-map-generation pipeline 200 may comprise an extractor 210, an association engine 220, a view generator 230, and a model trainer 240 that are configured to work together to generate a heat map for target values for a target status dimension (which, as explained further below, can take many different forms). As shown in FIG. 2, each of these elements of the heat-map-generation pipeline 200 are shown as components of a computing platform 202. For instance, the computing platform 202 may be similar to the back-end computing platform 102 shown in FIG. 1. Other implementations of the heat-map-generation pipeline 200 are also possible.

The heat-map-generation pipeline 200 may be based on a hierarchical taxonomy of location entities (e.g., data assets that correspond to respective spatial locations or physical objects) associated with the construction project (e.g., a location hierarchy). Prior to generation of a heat map, the hierarchical taxonomy may be generated for the construction project by the location entity taxonomy data science model 222 shown in the association engine 220.

At a high level, the location entity taxonomy data science model 222 may generate the hierarchical taxonomy of location entities associated with the construction project in the following way.

As input, the location entity taxonomy data science model 222 may receive, in digital form, a set of one or more two-dimensional (2D) drawings for the construction project. The one or more 2D drawings may be received, for example, from an end-user device 212a (which may correspond to one of the client devices 112 shown in FIG. 1) via a communication path (which may correspond to one of the communication paths 110 shown in FIG. 1). The one or more 2D drawings may take many forms and may be stored in a variety of file formats. Some examples of forms that 2D drawings may take include architectural drawings, construction blueprints, floor plans, concept drawings, elevation drawings, electrical drawings, structural drawings, detail drawings, installation drawings, fire protection drawings, site plans, reflected ceiling plans, mechanical drawings, plumbing drawings, HVAC (Heating, Ventilation, and Air Conditioning) drawings, foundation plans, and landscape drawings, to name a few. Such drawings may be stored in formats such as portable document format (PDF), scalable vector graphics (SVG), portable network graphics (PNG), graphics interchange format (GIF), tagged image file (TIFF), and Joint Photographic Experts Group (JPEG), to name a few. Other forms and formats are also possible.

Once the one or more 2D drawings have been received, the location entity taxonomy data science model 222 may identify one or more location entities within the 2D drawings. The function of identifying the one or more location entities may take various forms and may generally involve performing a layout analysis of the one or more 2D drawings and retrieving additional information about the one or more 2D drawings to supplement the layout analysis. The function of performing the layout analysis may take various forms.

For example, the layout analysis may comprise an area detection phase and an object detection phase. During the area detection phase, the location entity taxonomy data science model 222 may utilize one or more image processing techniques (e.g., image segmentation techniques or unsupervised image processing models) to the one or more 2D drawings to detect areas (e.g., rooms or other location entities) depicted in the one or more 2D drawings. More information about automatically detecting areas within 2D image files can be found in U.S. Pat. No. 11,410,362 (issued on Aug. 9, 2022 and entitled "Automatic Area Detection"), which is hereby incorporated by reference in its entirety. During the object detection phase, the location entity taxonomy data science model 222 may utilize one or more object detection techniques to produce one or more respective bounding boxes and one or more respective labels (e.g., indicating respective object types) for the one or more location entities depicted in the 2D drawings.

The layout analysis may also take other forms.

After the layout analysis has been performed, the location entity taxonomy data science model 222 may utilize one or more information extraction techniques to retrieve additional information that may indicate whether one or more of the areas identified during the layout analysis comprise location entities.

The information extraction techniques may take various forms. For instance, as one example, the information extraction techniques may involve applying one or more Optical Character Recognition (OCR) techniques to recognize text in the one or more 2D drawings that may indicate the one or more location entities. As another example, the information extraction techniques may involve applying one or more natural language processing (NLP) techniques to text extracted from the one or more 2D drawings to recognize words, phrases, labels, dimensioning information, or other semantic information that may indicate the one or more location entities.

The information extraction techniques may also take other forms.

After the layout analysis has been performed and the information extractions techniques have been applied, the location entity taxonomy data science model 222 may determine relationships between the one or more location entities that were identified. The function of determining relationships between the one or more location entities that were identified may take various forms. As one possibility, the function of determining relationships between the identified one or more location entities may involve determining graph data (e.g., in the form of vector embeddings or position embeddings) based on image embeddings produced via the area detection phase, bounding boxes produced via the object detection phase, and/or the one or more location entities identified via the information extraction techniques.

The function of determining relationships between the identified one or more location entities may also take other forms.

Once the relationships have been determined, the location entity taxonomy data science model 222 may generate the hierarchical taxonomy of location entities associated with the construction project. The hierarchical taxonomy may take various forms. As one possibility, the hierarchical taxonomy may comprise a hierarchical data structure that classifies the one or more location entities based on similar characteristics. Within the hierarchical data structure (which may, for example, be an implementation of a graph), location entities may be represented by nodes and relationships may be represented by edges. Each given node may include one or more labels that identify one or more respective location types (e.g., room, unit, floor, etc.) of a given location entity the given node represents. Each given edge may be associated with one or more indicia of one or more types of relationships between the respective location entities that are represented by the two nodes that the given edge connects. For instance, as one example, an indicator associated with an edge that connects a first node that represents a location entity of type "floor" to a second node that represents a location entity of type "room" may indicate that the represented room is located on the represented floor. Note that some types of relationships between location entities may be transitive. For instance, if a given physical object is related to (e.g., located within) a given room and the given room is related to (e.g., located within) a given floor, the given physical object is also related to (e.g., located within) the given floor.

The hierarchical taxonomy may also take other forms.

More details about how a location entity taxonomy data science model such as the location entity taxonomy data science model 222 may operate and the forms a hierarchical taxonomy of location entities may take can be found in U.S. patent application Ser. No. 17/957,501 (filed on Sep. 30, 2022 and entitled "Computer Systems and Methods for Identifying Location Entities and Generating a Location Entity Data Taxonomy"), which is hereby incorporated by reference in its entirety.

The generated hierarchical taxonomy of location entities associated with the construction project consolidates a great deal of spatial information about how different location entities associated with the construction project are related to each other.

However, in addition to the location entities that the hierarchical taxonomy represents and the relationships between those location entities that the hierarchical taxonomy captures, there are other types of data assets and relationships associated with a construction project that may be of interest for generating a heat map. For example, informational data assets such as requests for information (RFIs), punch lists (e.g., which list work that has not yet been completed or has been completed incorrectly), daily logs (e.g., which record information about work that is performed each day on the construction project), inspection documents (e.g., which record information about the results of inspections), construction submittals (e.g., mock-ups or other documents that contractors create to depict proposed plans), change orders, construction site observation reports, project management records (e.g., project schedules and project budgets), third-party records (e.g., applicable zoning restrictions, real-estate title records and purchase records, records of public hearings pertinent to the construction project), and integration documentation for construction data services (such as ConstructConnect, Dodge Construction Network, and Datatree), and other collections of information that might not, in and of themselves, represent spatial locations or physical objects directly.

Nevertheless, such informational data assets may relate to location entities (e.g., spatial locations or physical objects) in ways that influence the values of the target status dimension for those location entities. For instance, as one example, consider a scenario in which a given punch list indicates that drywall has not yet been installed in a first room on a given floor. In addition, imagine the punch list indicates that drywall has been installed incorrectly in a second room on the given floor. If the target status dimension for a desired heat map in this example is a material installation status for a particular trade or object (e.g., for drywall), the punch list contains information that indicates the value of the target status dimension for at least the first room and the second room. In this sense, the punch list is related to the first room, the second room, and the given floor by virtue of the fact that it refers to tasks to be performed therein. However, since a punch list is an informational data asset rather than a location entity, the hierarchical taxonomy alone may lack a way to represent the punch list and a way to capture the relationships between the punch list and the first room, the second room, and the given floor, respectively. More generally, as illustrated by this example, a hierarchical taxonomy alone might not include sufficient information for determining values of a particular status dimension and for identifying locations on a map to which those values correspond.

Therefore, to determine relationships that exist between informational data assets and location entities (and to determine relationships that exist between the informational data assets themselves), the association engine 220 includes an asset-relationship engine 224 in addition to the location entity taxonomy data science model 222. The data that the asset-relationship engine 224 utilizes to determine those relationships may, at the outset, be stored across multiple disparate data repositories associated with the construction project. Furthermore, the data that the asset-relationship engine 224 utilizes to determine those relationships may be stored in different formats and/or contained in different types of data structures, such as objects (e.g., implemented via object-oriented programming languages), arrays and/or vectors (e.g., as implemented by any of various programming languages), and/or other types of data structures. For these reasons, the tasks of locating, collecting, parsing, and packaging the data into a consistent form (e.g., format and/or data structure) in which the asset-relationship engine 224 is configured to receive input may involve a number of operations.

Such operations for locating, collecting, parsing, and packaging the input data for the asset-relationship engine 224 may be performed by the extractor 210 (which may serve as a data ingestion layer for the association engine 220). The extractor 210 may receive (e.g., pull) data assets via one or more communication paths (e.g., network connections) from one or more data repositories (e.g., databases or other types of data stores) associated with the construction project. Furthermore, as shown, the extractor 210 may receive data assets from an end-user device 212*a*. Note that the received data assets may comprise, among other types of data assets, the same 2D drawings that were used by the location entity taxonomy data science model 222.

As discussed above, the data assets may correspond to numerous different types of information related to the construction project and may take various forms (e.g., RFIs, punch lists, daily logs, inspection documents, construction submittals, construction site observation reports, project management records, third-party records, and integration documentation for construction data services, etc.). For each given data asset that is received, the extractor 210 may perform one or more operations to extract data from the given data asset and transform the extracted data into a form that can be utilized by the asset-relationship engine 224. The one of more operations to extract data from the given data asset may take many forms. The form that the one or more operations take in any particular instance may depend on the type of the given data asset and the format in which the given data asset is received.

For example, as one possibility, consider a scenario in which the received data asset is received in the form of a drawing. In this scenario, there may be textual elements depicted in the drawing, but the textual elements may be stored as a rasterized image rather than as searchable text. The extractor 210 may apply optical character recognition (OCR) to detect the textual elements and to convert the detected textual elements into a usable encoding (e.g., American Standard Code for Information Exchange (ASCII) or Unicode). Further, the extractor may repackage the detected textual elements into a data structure that represents the received data asset in a form that is suitable for the asset-relationship engine 224 to use as input.

As another possibility, the received data asset may be received in the form of an object that is an instance of a class (e.g., a class defined in code that is written in an object-oriented programming language). For example, imagine a scenario in which the data asset was created via a user interface that collects feature values through form elements (e.g., text fields, check boxes, radio buttons, etc.). Construction management software may include such user interfaces for many types of data assets (e.g., inspection logs, daily reports, budgets, timesheets, etc.). In this scenario, the class may define data members for objects of the class and class methods whereby the data member values for an object that is an instance of the class may be retrieved (e.g., as return values for the methods). When feature values are received through a user interface, program code may instantiate a new object of the class and store each feature value as a member data value associated with the corresponding form element through which the feature value was received. The extractor 210 may retrieve the data member values by calling the methods via the object that represents the received data asset and repackage the data member values into a data structure that represents the received data asset in a form that is suitable for the asset-relationship engine 224 to use as input.

As another possibility, the received data asset may be received in the form of structured data text that conforms to a particular format, scheme, and/or grammar (e.g., such as JavaScript Object Notation (JSON)). In general, data assets that may be received in the form of instantiated objects of a class (e.g., inspection logs, daily reports, budgets, timesheets, etc.) may also be received in the form of structured data text because the structured data text is a form that allows data to be interchanged between software written in different programming languages. In this scenario, the extractor 210 may apply a parser for the particular format, scheme, and/or grammar to extract the structured data from the received data asset and repackage the structured data into a data structure that represents the received data asset in a form that is suitable for the asset-relationship engine 224 to use as input.

As another possibility, the received data asset may be received as free-form text that is written in a natural language. Some types of data assets (e.g., daily logs, inspection documents, construction submittals, construction site observation reports, project management records, third-party records, etc.) commonly include such free-form text. In this scenario, the extractor 210 may apply one or more natural language processing (NLP) techniques to extract data from the free-form text and repackage the extracted data into a data structure that represents the received data asset in a form that is suitable for the asset-relationship engine 224 to use as input.

As another possibility, the received data asset may be received in a form that declares a data member of a certain type (e.g., a field for an attribute), but the received data member may lack a corresponding data member value for the declared data member (e.g., a formal parameter specified in the definition of a class of which the received data asset is an instantiated object may identify the data member, but the instantiated object may lack an actual parameter that corresponds to the formal parameter). This scenario may occur, for example, if a user interface (e.g., in construction management software) for creating data assets of a particular type (e.g., inspection logs, daily reports, budgets, timesheets, etc.) includes form elements that are optional (e.g., not marked as mandatory). In this scenario, the extractor 210 may apply a predictive analytics pipeline that comprises an artificial intelligence (AI) model to predict a data member value for the declared data member. More information about predictive analytics pipelines can be found in U.S. patent application Ser. No. 18/619,072 (filed on Mar. 27, 2024 and entitled "Computing System and Method for Creating and Executing Attribute-Specific Predictive Analytics Pipelines for a Construction Project"), which is hereby incorporated by reference in its entirety. The extractor may repackage the predicted data member value and any member data values found in the received data asset into a data structure that represents the received data asset in a form that is suitable for the asset-relationship engine 224 to use as input.

The one of more operations to extract data from the given data asset may also take many forms.

The form that is suitable for the asset-relationship engine 224 to use as input may define one or more feature variables (e.g., formal parameters). Each feature variable may correspond to specific type of data that may be found in the data assets. The specific type of data to which a given feature variable corresponds may take many forms. A few examples possible types of data include a data-asset type (e.g., RFI, daily log, punch list, etc.), a data-asset date of creation, a data-asset completion status, a data-asset target completion date, a token (e.g., word or group of words) present in a data asset, a trade associated with a data asset (e.g., excavating, concrete, electrical, plumbing, HVAC, masonry, drywall, etc.), one or more types of tasks associated with the data objects, and a list for storing indicia of relationships (e.g., to location entities and/or to data assets of other types), among other possibilities. Each data asset may include one or more respective feature values (e.g., actual parameters) for one or more of the feature variables. In some instances, a respective feature value may be blank (e.g., null) or empty. For example, if a given data asset includes a feature variable that is a list for storing indicia of relationships, the list may be empty initially (e.g., if the given data asset has not yet been transmitted to the asset-relationship engine 224 or if the asset-relationship engine 224 has not yet determined any relationships between the given data asset and any of the other data assets associated with the construction project).

Once the extractor 210 has transformed the data assets into a form that is suitable for the asset-relationship engine 224, the extractor 210 may transmit the data assets to the asset-relationship engine 224 directly (e.g., via a communication path such as a network connection) or to a data repository from which the asset-relationship engine 224 can retrieve the data assets on demand. For each given data asset, the asset-relationship engine 224 may determine one or more respective relationships between the given data asset and one or more location entities. (In addition, the asset-relationship engine 224 may determine one or more respective relationships between the given data asset and one or more data assets of other types.)

The approach which the asset-relationship engine 224 applies to determine a relationship between a given data asset and a given location entity may take many forms.

As one possibility, the asset-relationship engine 224 may identify a given feature variable that is explicitly defined as location associated with the data asset, retrieve the corresponding feature value for the given feature variable from the given data asset, and detect the given location entity that matches the feature value. For instance, if the feature value were to be "room X, floor Y," the asset-relationship engine 224 would detect that a location entity that represents a room number X on a floor number Y.

As another possibility, the asset-relationship engine 224 may apply a large-language model (LLM) that has been trained for named entity recognition (NER) (e.g., such as an instance of the bert-base-NER model that is available through the Hugging Face® platform) to identify location names to one or more tokens that are included as feature values in the given data asset. In this manner, the asset-relationship engine may identify a token that comprises a location name and detect that the given location entity matches the token.

Other approaches for determining relationships between data assets and location entities are also possible.

Once a given relationship between a data asset and a location entity has been determined, the asset-relationship engine 224 may store an indication of the given relationship in any of various forms.

As one possibility, the asset-relationship engine 224 may update the data asset and/or the location entity to include an indication of the given relationship. For instance, if the data asset is stored as an object that includes a data member (e.g., a list) for storing indicia of relationships, the asset-relationship engine 224 may add an indication of the relationship to the data member.

As another possibility, the asset-relationship engine 224 may add an edge to a construction knowledge graph to connect a node that represents the data asset to a node that represents the location entity. More information about construction knowledge graphs (and approaches for determining relationships between data assets and location entities) can be found in U.S. patent application Ser. No. 17/307,869 (filed on May 4, 2021 and entitled "Construction Knowledge Graph), which is hereby incorporated by reference in its entirety. As explained above, location entities may be included in the hierarchical taxonomy of location entities associated with the construction project. Therefore, if the hierarchical taxonomy is represented in the form of a graph (which is one of many possible forms), nodes that represent data assets in the construction knowledge graph may be connected to nodes that represent location entities in the hierarchical taxonomy. Furthermore, nodes that represent data assets may also be connected to other nodes that represent data assets that are not location entities. In this scenario, the hierarchical taxonomy and the construction knowledge graph may constitute a combined graph that captures the information found in both. The combined graph may facilitate discovery of complex interrelationships between a given location entity and multiple data assets that may each influence the value of the target status dimension for the given location entity in some way. For example, consider a scenario in which the given location entity is related to the different data assets-namely, a first data asset that represents a task listed on a master schedule, a second data asset that represents an RFI, and a third data asset that represents an invoice. In this scenario, each of the first, second, and third data assets may influence the value of the target status variable for the given location entity. Since the location entity is connected to each of the first, second, and third data assets in the combined graph, the view generator 230 may be able to take the respective influences of each of the first, second, and third data assets into account when determining the value of the target status variable for the given location entity. Furthermore, the view generator 230 may also take relationships between the first, second, and/or third data assets and additional data assets that may or may not have direct relationships with the given location entity.

Other approaches for storing indicia of relationships between data assets and location entities are also possible.

Once the relationships between the data assets and the location entities have been determined, the association engine 220 may store indications of the relationships in a data repository that is accessible to the view generator 230 (or may transmit the indications directly to the view generator 230 via a communication path). As noted above, in one example, the indications of the relationships may be stored in the form of data members of the data assets. In another example, the indications of the relationships may be stored in some other form (e.g., in a matrix in which each given row maps to a first data asset, each given column maps to a second data asset, and an entry occurring at the intersection of the given row and the given column indicates any relationship(s) that exist between the first data asset and the second data asset).

Turning to the view generator 230, the view generator 230 may receive, via a communication path from an end-user device 212*b* (which may correspond to one of the client devices 112 shown in FIG. 1) via a communication path (which may correspond to one of the communication paths 110 shown in FIG. 1), an indication of a target status dimension and a request to generate a heat map for the construction project that represents values for the target status dimension along a color scale. Optionally, the request may specify a particular area of the construction project that is to be depicted by the heat map (e.g., a floor or other type of space associated with the construction project). In various examples, the end-user device 212*b* and the end-user device 212*a* may be the same device or may be different devices. The target status dimension may take many forms.

For instance, as one possibility, the target status dimension may match a given feature variable that is defined for one or more types of data assets. In this scenario, the value of the target status dimension for a given location on a heat map may be the corresponding feature value (for the feature variable) included in a data asset that is related to the given location. For example, the location on the heat map may map to a location entity. If the location entity or some other data asset that is related to the location entity includes a feature value for the given feature variable, the value of the target status dimension for the location that maps to the location entity may be the feature value. Alternatively, if the feature variable and the target status dimension are defined across different domains (e.g., one is a normalized version of the other) and/or are measured in different units (e.g., days as opposed to weeks, dollars as opposed to some other type of currency, etc.), the value of the target status dimension may be determined by applying a transformation operation (e.g., that converts values of the feature variable to values of the target status dimension) to the feature value. If multiple data assets that include respective feature values for the feature variable are related to the given location, the value of the target status dimension for the given location may be determined by applying a predetermined rule to the respective feature values (e.g., by selecting a maximum respective feature value from the respective feature values; selecting a minimum respective feature value from the respective feature values; calculating a mean, median, or mode of the respective feature values; or by applying some other predetermined rule for determining the value of the target status dimension based on the respective feature values).

As one example of how a target status dimension may match a given feature variable, consider a scenario in which the target status dimension is a completion status for a task (e.g., installation of a construction object, just as electrical conduit). For each given location that is to be depicted on a heat map, the view generator 230 may determine a respective value for the target status dimension in the following manner. Specifically, the view generator 230 may commence by identifying a location entity to which the given location maps. Next, the view generator 230 may identify one or more data assets that are related to the identified location entity based on the relationships that were determined by the asset-relationship engine 224. After identifying the one or more data assets, the view generator 230 may identify a feature value corresponding to the data asset(s) for a feature variable that represents the completion status and assign that feature value as the completion status for the given location in the heat map.

As another possibility, the target status dimension might not directly match any of the feature variables that are directly defined for the data assets. Instead, in this scenario, the target status dimension may be defined according to a function that utilizes one or more feature variables as input (and possibly one or more other types of variables that are not defined in terms of a single data asset). As one example, consider a scenario in which the target status dimension is a construction schedule status for completion of a given task (e.g., installation of electrical conduit on the second floor), based on a master schedule for the construction project.

For example, the current completion status for the data assets representing the electrical conduit on the second floor may be a feature value included in each data asset (e.g., not installed, installed, inspected, etc.). Further, a master schedule for the construction project may indicate a date on which each respective data asset, representing electrical conduit, is scheduled to be installed. Accordingly, when the view generator 230 receives the request to generate a heat map for the construction schedule status for electrical conduit installation on the second floor, the view generator 230 may reference the data asset representing the master schedule and compare (i) the scheduled installation date for each electrical conduit with (ii) the current completion status, on the current date, of each electrical conduit. In this way, a respective value may be determined for each electrical conduit that indicates whether its completion status is ahead of schedule (and by how many days), on schedule, or behind schedule (and by how many days). This information, in turn, may be mapped to the various location entities on the second floor (e.g., rooms, hallways, etc.) that are associated with each conduit and used to generate data indicating the requested heat map.

In addition, the current value of the completion status for the given data asset may influence the likelihood that one or more other data assets will be completed on schedule as a result of a relationship between the given data asset and the one or more other data assets. For instance, consider a scenario in which the current value of the completion status indicates that a first task associated with the given data asset has not been (or likely will not be) completed on time in accordance with a given schedule that is specific to the given data asset. In this scenario, the current value of the completion status may further indicate that a second task associated with a second data asset that is related to the given data asset is unlikely to be completed in accordance with a given schedule that is specific to the second data asset, if commencement and/or completion of the second task is constrained not to occur until after the first task has been completed.

Such constraints commonly exist in construction projects. For instance, as one example, the task of framing a building generally cannot be completed until after the task of pouring a concrete foundation for the building has been completed. Furthermore, in this example, a third task associated with a third data asset that is related to the second data asset may be unable to be completed until the second task is completed. The task of installing drywall throughout a building, for example, generally cannot be completed until framing has been completed. Additional tasks may similarly depend on the completion of the first, second, and/or third tasks, and so on. As a result, a delay in the completion of one task associated with the given data asset may result in a snowball effect that delays completion of many other tasks associated with many other data assets. Such dependencies between tasks may be indicated by the relationships that the asset-relationship engine 224 determined and stored (e.g., in the form of data members for data assets or edges in a knowledge graph). As a result of such dependencies, a heat map representing a construction schedule status for a given task might utilize information from not only data assets associated with the given task and with the master schedule, but also data assets associated with preceding tasks on which the given task depends. Various other examples are also possible.

As another example, consider a scenario in which the target status dimension is a construction budget status based on a master budget for the construction project (e.g., for a given trade and/or a given area of the construction project). In this scenario, imagine that a given data asset represents a given change order that is related to a location entity that represents a given room, and that the change order is associated with an increase in cost to the construction project. Further, one or more data assets may represent purchase orders for a given construction material that is related to the given room. Further, the purchase orders may indicate a material cost that is lower than the material cost estimated in the master budget. Other examples of data assets that might affect a construction project budget are also possible. As discussed in the examples above, each of these data assets may be associated with the location entity of the given room, as determined by the asset relationship engine 224. Accordingly, when the view generator 230 receives the request to generate a heat map for the construction budget status, the view generator 230 may reference the data asset representing the master budget and compare i) the budgeted costs associated with the location entity representing the given room with ii) the actual realized costs associated with the location entity representing the given room. In this way, a value (e.g., an aggregate value) may determined for the location entity that indicates whether it is under budget (and by how much), on budget, or over budget (and by how much). This information, in turn, may be mapped to the given room. A similar approach may be carried out for each location entity depicted in the requested heat map.

As another example, consider a scenario in which the target status dimension is an indication (e.g., a Boolean indication) of whether a given data asset relates to a task included in a critical path for the construction project. When the view generator 230 receives a request to generate a heat map for the critical path, the view generator 230 may identify data assets that represent tasks that have been flagged (e.g., by having a particular feature value for a feature variable associated with the critical path) as being in the critical path. Next, the view generator 230 may identify location entities that are related to the identified data assets (e.g., based on the relationships determined by the association engine 220). The view generator 230 may assign a first value (e.g., one if the target status dimension is Boolean) of the target status dimension to the identified location entities. Location entities that are not related to any of the identified data assets may be assigned a second value (e.g., zero if the target status dimension is Boolean).

A target status dimension may also take other forms.

The illustrative examples of target status dimensions provided above demonstrate that determining a value of a target status dimension for a given location entity may involve analysis of multiple data assets of different types and of multiple relationships of different types between such data assets. There are many different types of data assets that may be related to the given location entity in many different ways. Furthermore, data assets related to the given location entity may, in turn, be related to other data assets in ways that may influence the value of the target status dimension for the given location entity. The extent of such influence may vary widely depending on the types of relationships and on the types of the data assets involve. Furthermore, depending on the nature of any particular relationship in question, such influence may be probabilistic rather than deterministic. Given that there may be thousands of data assets associated with a construction project and that the number of relationships between those assets may be several orders of magnitude larger, the complexity of determining a value of a target status dimension for a given location entity may, as a practical matter, be nearly unbounded. By extension, the complexity involved in determining the values for many different types of target status dimensions renders it impractical to determine such values manually (e.g., using pencil and paper)—or even in hard-coded computer logic. In addition, since new data assets associated with the construction project may be created frequently (e.g., daily) and some types of data assets (e.g., change orders) may result in changes that alter the nature of preexisting relationships between preexisting data assets, an approach using hard-coded logic alone would likely have to be updated frequently to avoid obsolescence.

Given these and other technical challenges involved in determining target status dimensions, a machine-learning approach may be used. Specifically, as shown in FIG. 2, the view generator 230 may include one or more deployed machine-learning models 232. For a given target status dimension, the deployed machine-learning models 232 may include a given machine-learning model that has been trained (e.g., by the model trainer 240, as will be discussed further below) to predict values of the given target status dimension for location entities based on a set of inputs that the given machine-learning model is configured to receive. Depending on the nature of the given target status dimension, the set of inputs that the given machine-learning model is configured to receive may take many forms. For instance, the set of inputs may comprise (i) one or more feature variables included in a location entity for which a value of the target status dimension is to be predicted, (ii) one or more feature variables included in any data asset that is related to the location entity, and/or (iii) one or more indicia of the relationships (and corresponding relationship types) between the location entity and data assets related to the location entity.

In addition to including respective machine-learning models for predicting values of target status dimensions, the deployed machine-learning models 232 may include one or more machine-learning models that have been trained (e.g., by the model trainer 240) to predict risks (e.g., budget risks that may cause the construction project to exceed a projected cost, schedule risks that may cause the construction project not to be completed on time, etc.) and/or one or more machine-learning models to recommend actions to be taken (e.g., actions that may mitigate risk, actions that may reduce cost, actions that may reduce estimated completion times, etc.). Like the given machine-learning model described above for predicting values of a given target status variable, a given machine-learning models for predicting risk or for recommending actions may be based on a sets of inputs which may take many forms (e.g., depending on the type of risk to be predicted or the type of action to be recommended). For instance, the set of inputs may comprise (i) one or more feature variables included in any data asset associated with the construction project and/or (iii) one or more indicia of the relationships between data assets associated with the construction project.

Before being deployed for the view generator 230, the deployed machine-learning models 232 may have been trained by the model trainer 240. The model trainer 240 may be configured to ingest historical data from historical construction projects (and/or simulated construction projects) and derive training data from the historical data. The methodology applied by the model trainer 240 for deriving training data from historical data may take many forms.

As one possibility, consider a scenario in which the model trainer 240 is creating training data for a given machine-learning model configured to predict a given type of risk. To create a given training instance to be included in the training data for the given machine learning model, the model trainer 240 may begin by identifying a given historical construction project on which the training instance will be based. Next, the model trainer 240 may determine whether the given type of risk corresponds to an event and/or result that actually did occur in association with given historical construction project.

If such an event and/or result occurred, the model trainer 240 may determine a set of input values for the given historical construction project as those input values were at a point in time before the event and/or result occurred. Next, the model trainer 240 may create a training instance that includes (i) the determined set of input values and (ii) a label indicating that the event/result corresponding to the given type of risk occurred.

On the other hand, is such an event and/or result did not occur, the model trainer 240 may determine a set of input values for the given historical construction project as those input values were at some point in time before the historical construction project was completed. Next, the model trainer 240 may create a training instance that includes (i) the determined set of input values and (ii) a label indicating that the event/result corresponding to the given type of risk did not occur.

Optionally, the model trainer 240 may create multiple training instances based on the given historical project such that each of the training instances represents a state of the given historical construction project at different point in time. For example, the model trainer 240 may detect a series of points in time at which the set of input values for the given historical project changed. For each respective point in time in the series, the model trainer 240 may create a training instance that includes (i) a respective set of input values as determined for the given historical construction project as those input values were at the respective point in time and (ii) a label indicating whether an event/result corresponding to the given type of risk occurred after the respective point in time.

As another possibility, consider a scenario in which the model trainer 240 is creating training data for a given machine-learning model configured to recommend a given type of action. To create a given training instance to be included in the training data for the given machine learning model, the model trainer 240 may begin by identifying a given historical construction project on which the given training instance will be based. Next, the model trainer 240 may determine whether an action of the given type was taken in association with the given historical construction project. If such an action was taken, the model trainer 240 may determine a set of input values for the given historical construction project as those input values were at a point in time before the action was taken. Next, the model trainer 240 may create a training instance that includes (i) the determined set of input values and (ii) a label indicating that the action is recommended.

On the other hand, if an action of the given type was not taken in association with the construction project, the model trainer 240 may determine a set of input values for the given historical construction project as those input values were at a point in time before the given historical construction project was completed. Next, the model trainer 240 may create a training instance that includes (i) the determined set of input values and (ii) a label indicating that the action is not recommended.

In addition, even if a given construction project has not yet been completed, the model trainer 240 may generate a training instance based on the given construction project based on a feedback loop. For instance, consider a scenario in which the view generator recommends an action of the given type to a user. If the user does not take the recommended action and/or gives feedback indicating that the recommendation was not helpful, the model trainer 240 may determine the set of input values for the given project as those input values were when the recommendation was provided to the user. Next, the model trainer 240 may create a training instance that includes (i) the determined set of input values and (ii) a label indicating that the action is not recommended.

The methodology applied by the model trainer 240 for deriving training data from historical data may also take other forms.

As additional historical data becomes available over time, the model trainer 240 may generate updated training data based on the additional historical data, train updated machine-learning models, and transmit the updated machine-learning models to the view generator 230 to be deployed.

The deployed machine-learning models 232 may comprise any of various different types of machine-learning models. For instance, as one possibility, the deployed machine-learning models 232 may include one or more generative Artificial Intelligence (AI) models that can be used to perform a predictive task. The one or more generative AI models could take any of various forms—including, but not limited to, any of various types of large-language models (LLMs).

As one example, the deployed machine-learning models 232 may include a type of LLM referred to as a Bidirectional Encoder Representations from Transformers ("BERT") model, which was originally developed by Google®. A BERT model may be trained via a pre-training phase that involves unsupervised training (e.g., via contrastive divergence, Kullback-Leibler divergence, or another unsupervised training technique) on a large corpus of text (which is treated as unlabeled training data) in a natural language (e.g., English). A number of pre-trained BERT models are generally available in the industry (e.g., such as Google®'s pre-trained BERT model that can be downloaded via the Google® Research GitHub® repository). Such pre-trained models may, if desired, be installed and executed locally (e.g., within the back-end computing platform 102 of FIG. 1). Alternatively, such pre-trained models may be executed remotely and be accessed through a network via an application programming interface (API).

In general, a pre-trained BERT model may be sufficient to predict certain types of risks and/or severity levels of those risks based on certain types of informational data assets (e.g., informational assets that include text in a natural language) without any additional training. However, if desired, an optional fine-tuning phase that involves supervised training (e.g., via backpropagation or another supervised training technique) on labeled training data may also be applied (e.g., by the model trainer 240) to further train a BERT model. In some cases, the optional fine-tuning phase of training may enhance the BERT model's capacity to predict a risk of interest and/or the severity level of the risk. For instance, the optional fine-tuning phase may involve training the BERT model with training data that includes terminology specific to the construction industry in order to configure the BERT model to decipher construction-specific meaning from input (e.g., by adjusting weights, biases, and/or one or more probability distributions represented within the BERT model). In the optional fine-tuning phase, the model trainer 240 may train the BERT model to evaluate textual elements using training data derived from historical projects and/or simulated projects whose values for the given project attribute are known (e.g., verified and treated as ground-truth data).

As another example, the deployed machine-learning models 232 may include a type of LLM referred to as a Generative Pre-trained Transformer ("GPT") model, which was originally developed by OpenAI®. Like the BERT model described above, such a GPT model may be trained via a pre-training phase that involves unsupervised training (e.g., via contrastive divergence, Kullback-Leibler divergence, or another unsupervised training technique) on a large corpus of text (which is treated as unlabeled training data) in a natural language (e.g., English). A number of pre-trained GPT models are generally available in the industry (e.g., such as OpenAI®'s pre-trained GPT-2, GPT-3, and GPT-4 models that are available through the OpenAI® Platform). Such pre-trained models may, if desired, be installed and executed locally (e.g., within the back-end computing platform 102 of FIG. 1). Alternatively, such pre-trained models may be executed remotely and be accessed through a network via an application API.

In general, like the pretrained BERT model discussed above, a pre-trained GPT model may be sufficient to predict certain types of risks and/or severity levels of those risks based on certain types of informational data assets (e.g., informational assets that include text in a natural language) without any additional training. However, if desired, an optional fine-tuning phase that involves supervised training (e.g., via backpropagation or another supervised training technique) on labeled training data may also be applied (e.g., by the model trainer 240) to train a GPT model further. In some cases, the optional fine-tuning phase of training may enhance the GPT model's capacity to predict a risk of interest and/or the severity level of the risk.

The deployed machine-learning models 232 may also comprise other types of machine-learning models.

Returning to the view generator 230, the view generator 230 may be operable to, via the deployed machine-learning models 232, determine (e.g., predict) values of target status dimensions, predict risks, and suggest actions. The view generator 230 also includes a visual display engine 234 for generating a heat map and/or providing notifications of risks and/or suggested actions. Optionally, in some examples, the display engine 234 may be configured to display notifications of risks and/or notifications of suggested actions according to a prioritization scheme the view generator 230 is configured to apply. Such a prioritization scheme may take many forms. As one possibility, a prioritization scheme may specify that notifications of risks are to be displayed in reverse chronological order according to the respective dates on which the corresponding risks were initially predicted. As another possibility, a prioritization scheme may specify that notifications of risks of certain types should be displayed before risks of other types. As another possibility, a prioritization scheme may specify that risks are to be displayed in order of severity (e.g., where each risk is associated with a respective severity level). Prioritization schemes may also take other forms.

As noted above, the view generator 230 may receive an indication of a target status dimension (e.g., selected by a user via a user interface at a user device) and a request to generate a heat map that represents values for the target status dimension along a color scale. The request may also specify a selected area of the construction project to be depicted by the heat map (e.g., a selected floor). In response, the visual display engine 234 may generate data indicating a heat map that depicts the selected space. For each location entity corresponding to a respective location depicted on the heat map, the visual display engine 234 may receive a respective value for the target status dimension (e.g., from the deployed machine-learning models 232). The visual display engine 234 may assign a color to each respective location that indicates the respective value for the target status dimension in accordance with the color scale. The color scale may take many forms.

As one possibility, if there are a finite number of possible values for the target status dimension (e.g., the target status dimension is categorical), the color scale may utilize different colors to portray each of the possible values, respectively. For example, consider a scenario in which the target status dimension is a material installation status. In this scenario, imagine that there are five possible values for the target status dimension: material not yet delivered to the construction site; material delivered but not yet installed; material installed but not yet inspected; material installed and inspected, but not yet approved; and material installed, inspected, and approved. In this scenario, the color scale may utilize a different value to indicate each possible value (e.g., gray, magenta, purple, cyan, and green, respectively).

As another possibility, if the target status dimension is numeric (e.g., discrete or continuous), the color scale may be adapted to a range of numbers. The range of numbers may have a lower bound (e.g., a minimum possible value for the target variable) and/or an upper bound (e.g., a maximum possible value for the target variable) or may be unbounded. The range of possible values may measured in units of a particular type. For instance, if the target status dimension indicates whether construction tasks for data assets are ahead of schedule, on schedule, or behind schedule, the target status dimension may be measured in a unit of time (e.g., days, weeks, etc.). The manner in which the color scale is adapted to the range of numbers may take many forms. For instance, as one example, a binning approach (i.e., a bucketizing approach) may divide the range of numbers into a series of bins (i.e., non-overlapping subranges). A respective color may be assigned to each given bin such that each value of the target status dimension that falls in the given bin maps to the respective color. The number of bins used may, in some implementations, be configurable such that a user can achieve a desired level of granularity in the color scale. For instance, user input (e.g., provided via an end-user device) may indicate that three bins are to be used for a target status dimension that indicates whether construction tasks for data assets are ahead of schedule, on schedule, or behind schedule. Further, in this example, the user input may further indicate that a first bin is to include values that indicate a status of being ahead of schedule by at first threshold (e.g., five days), a second bin is to include values that are on schedule (e.g., values that fall between the first threshold and a second threshold), and that a third bin is to include values that are behind schedule by at least the second threshold. In other examples, different numbers of bins and/or thresholds may be used (note that the number of thresholds may, for example, equal the number of bins minus one such that each threshold defines a boundary between a respective pair of neighboring bins). Optionally, the user input may further specify the colors to be used for one or more of the bins (e.g., green for the first bin, yellow for the second bin, and red for the third bin).

Although the examples discussed herein have generally referred to using a color scale to indicate values, it should be understood that various visual treatments other than or in addition to colors are possible for indicate values of target status dimensions. Such treatments might indicate values of target status dimensions via fill patterns, outlines (e.g., tracing the perimeters of location entities in lines with particular patterns, colors, or thicknesses; drawing circles or other shapes around location entities; etc.), dynamic display schemes (e.g., causing location entities to blink at one or more rates, causing location entities to vibrate or move in some other manner, etc.), or formatting schemes (e.g., by changing the typeface of text displayed in location entities to bold or italic). Other types of visual treatment are also possible.

The color scale may also take other forms. Note that FIGS. 4-5 discussed further below illustrate two examples of heat maps in accordance with the present disclosure.

Other examples of heat-map-generation pipelines may also be created in accordance with the present disclosure, including but not limited to heat-map-generation pipelines that include more or fewer components than those shown in FIG. 2 or that perform any given action described above in a component other than the component in which the given action is described as being performed above.

Figure 3:
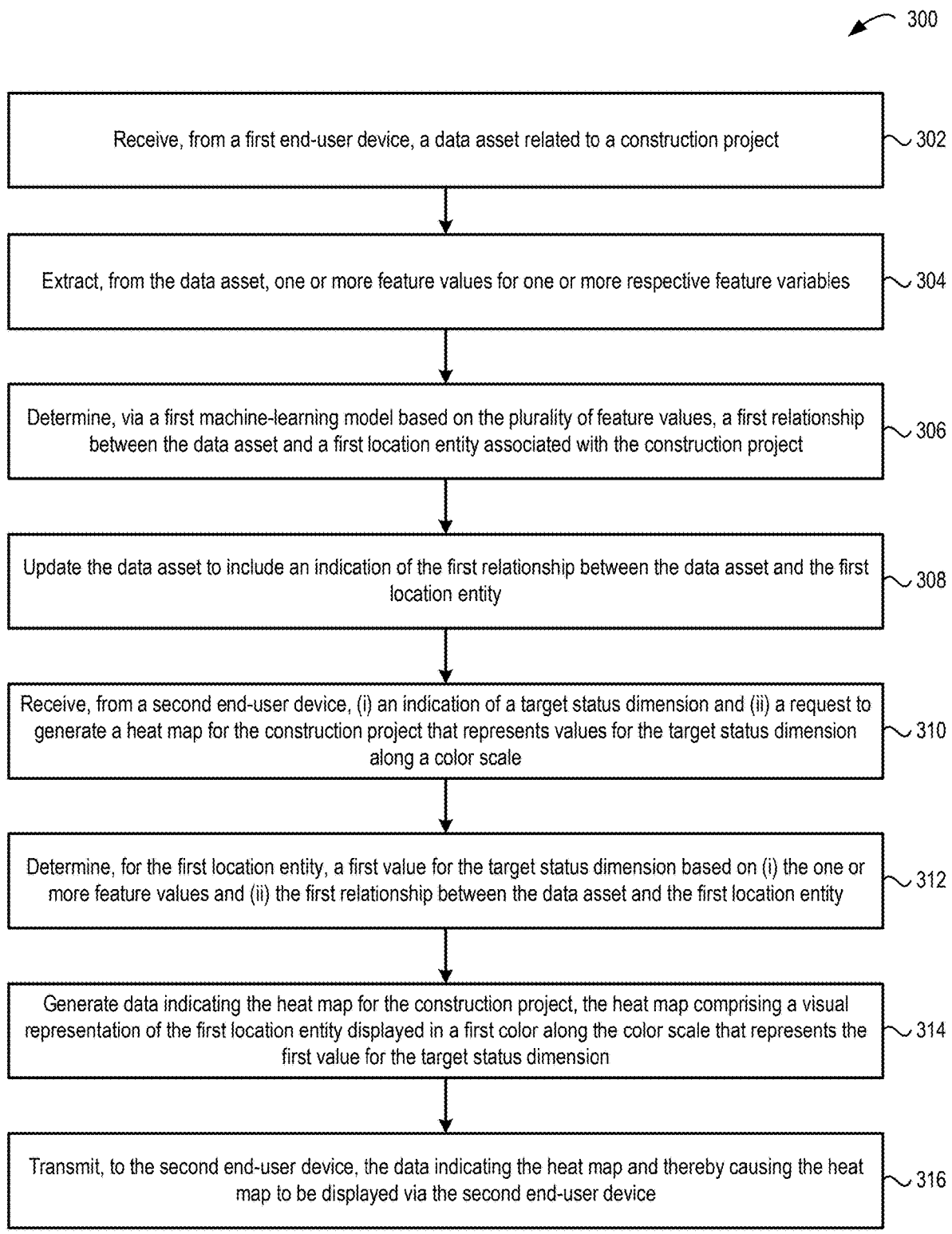
FIG. 3 depicts example functionality that may be carried out in order to generate a heat map for a construction project.

The functionality that may be carried out in order to generate a heat map for a construction project based on a target status dimension and a color scale may take any of various forms, and one possible implementation of that functionality is illustrated in FIG. 3. For purposes of illustration, the example functionality 300 of FIG. 3 is described as being carried out by the back-end computing platform 102 of FIG. 1, but it should be understood that the example functionality 300 of FIG. 3 may be carried out by any computing platform that is capable of running the software disclosed herein. Further, it should be understood that the example functionality of FIG. 3 is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular example.

As shown in FIG. 3, the example functionality 300 may begin at block 302 with the back-end computing platform 102 receiving, from a first end-user device, a data asset related to a construction project.

The data asset may take any of various forms. For example, the data asset may be an informational data asset such as, for example, an RFI, a punch list, a daily log, an inspection document, a construction submittal, a construction site observation report, a project management record (e.g., a project schedule, a project budget, etc.), a third-party record (e.g., a zoning restriction, a real-estate title record, a real-estate purchase record, a record of a public hearing pertinent to the construction project, etc.), an integration document (e.g., for construction data services such as ConstructConnect, Dodge Construction Network, and Datatree), or another collection of information memorialized in written form and/or image form. As noted above, the data asset may also be a set of 2D drawings that represents the various spatial locations (e.g., location entities) on the construction project as well as physical objects that are to be constructed.

The data asset may also take other forms.

Furthermore, the first end-user device may take many forms (e.g., such as one of the client devices 112 of FIG. 1 and/or the client device 700 described further below with respect to FIG. 7). The back-end computing platform 102 may receive the data asset from the first end user device via a communication path that may take many forms (e.g., such as the forms described above for the respective communication paths 110 described above with respect to FIG. 1).

At block 304, the example functionality 300 may further proceed with the back-end computing platform 102 extracting, from the data asset, one or more feature values for one or more respective feature variables.

The functionality for extracting the feature values may take various forms (e.g., as described above with respect to FIG. 2). For example, the functionality for extracting the feature values may involve applying information extraction techniques (e.g., OCR techniques and NLP techniques), calling class methods, applying a parser, and/or applying a predictive analytics pipeline that comprises an AI model.

Furthermore, the feature variables to which the extracted feature values correspond may take various forms (e.g., as described above with respect to FIG. 2). For example, each feature variable may correspond to a specific type of data that may be found in the data assets (or that may be determined based on data found in the data assets). The specific type of data to which a given feature variable corresponds may take many forms. A few examples of possible types of data include a data-asset type, a data-asset date of creation, a data-asset completion status, a data-asset target completion date, a token present in a data asset, a trade associated with a data asset, one or more types of tasks associated with the data asset, and a list for storing indicia of relationships, among other possibilities.

At block 306, the example pipeline functionality 300 may further proceed with the back-end computing platform 102 determining, via a first machine-learning model and based on the plurality of feature values, a first relationship between the data asset and a first location entity associated with the construction project.

The functionality for determining the first relationship may take various forms (e.g., as described above with respect to FIG. 2). For instance, as one possibility, the functionality for determining the first relationship may involve identifying a given feature variable that is explicitly defined as a location associated with the data asset, and detecting that a given location entity (e.g., a location entity within the location entity taxonomy generated by the location entity taxonomy data science model 222) matches the feature value. As another possibility, the functionality for determining the first relationship may involve applying an LLM that has been trained for NER to identify location names in one or more tokens that are included in the feature values. The functionality for determining the first relationship may also take other forms.

At block 308, the example pipeline functionality 300 may further proceed with the back-end computing platform 102 updating the data asset to include an indication of the first relationship between the data asset and the first location entity.

The functionality for updating the data asset may take various forms (e.g., as described above with respect to FIG. 2). For instance, as one possibility, if the data asset is stored as an object that includes a data member (e.g., a list) for storing indicia of relationships, the asset-relationship engine 224 may add an indication of the relationship to the data member. As another possibility, the asset-relationship engine 224 may add an edge to a construction knowledge graph to connect a node that represents the data asset in the knowledge graph to a node that represents the location entity in the knowledge graph and/or a hierarchical taxonomy of location entities. As another possibility, the asset-relationship engine 224 may add an edge to a construction knowledge graph to connect a node that represents the data asset to a node that represents the location entity. The functionality for updating the data asset may also take other forms.

At block 310, the example pipeline functionality 300 may further proceed with the back-end computing platform 102 receiving, from a second end-user device, (i) an indication of a target status dimension and (ii) a request to generate a heat map for the construction project that represents values for the target status dimension along a color scale. Optionally, the request may specify a particular floor or set of floors (or other type of space associated with the construction project) to be depicted by the heat map. Furthermore, the request may specify one or more filter parameters. The second end-user device may take many forms (e.g., such as one of the client devices 112 of FIG. 1 and/or the client device 700 described further below with respect to FIG. 7).

The target status dimension may take various forms (e.g., as described above with respect to FIG. 2). For instance, as one possibility, the target status dimension may match a given feature variable that is defined for the data asset (e.g., based on a type of the data asset). As another possibility, the target status dimension may be defined according to a function that utilizes one or more feature variables as input (e.g., a function with a domain that is defined as the set of possible values for the one or more feature variables and a range that is defined as the set of possible values for the target status dimension).

As one example, the target status dimension may be a material installation status which has a set of possible values comprising (i) a value indicating that a material corresponding to the material installation status has not yet been delivered to a site associated with the construction project; (i) a value indicating that the material has been delivered, but has not yet been installed; (iii) a value indicating that the material has been installed, but has not yet been inspected; (iv) a value indicating that the material has been installed and inspected, but has not yet been approved; and/or (v) a value indicating that the material has been installed, inspected, and approved.

As another example, the target status dimension may be a construction schedule status which has a set of possible values comprising: (i) a value indicating that construction (e.g., for a given task or trade) is ahead of schedule by at least a first threshold amount of time; (ii) a value indicating that the construction is on time (i.e., is not behind schedule by more than a second threshold amount of time; (iii) a value indicating that the construction is behind schedule by at least the second threshold amount of time.

As another example, the target status dimension may be a construction budget status (e.g., for a given task or trade) which has a set of possible values comprising: (i) a value indicating that a cost of a given aspect of the construction project (e.g., an amount that has already been spent and/or an amount that is projected to be spent) is under budget (i.e., is less than a budgeted cost by at least a first threshold amount); (ii) a value indicating that the cost of the given aspect of the construction project is on budget (i.e., does not exceed the budgeted cost by more than a second threshold amount); and/or (iii) a value indicating that the cost is over budget (i.e., exceeds the budgeted cost by at least the second threshold amount).

The target status dimension may also take other forms.

Furthermore, the color scale may take various forms (e.g., as described above with respect to FIG. 2). For instance, as one possibility, if there are a finite number of possible values for the target status dimension (e.g., the target status dimension is categorical), the color scale may utilize different colors and/or fill patterns to portray each of the possible values, respectively. As another possibility, if the target status dimension is numeric (e.g., discrete or continuous), the color scale may use different colors to correspond to different ranges within the numeric scale (using the binning approach discussed above). Alternatively, the color scale may use different shades of a given color and/or different variations of a fill pattern to indicate different values of the target variable. The color scale may also take other forms.

If one or more filter parameters are included in the request, the one or more filter parameters may take various forms.

As one possibility, a filter parameter may specify a time range of interest (e.g., a beginning date and/or an ending rate) for the heat map. For example, if the target status dimension is a schedule status (e.g., a construction schedule status, as described above), the time range may be included in the request to generate the heat map in order to specify that construction tasks that are scheduled to be completed outside the time range of interest are not to be taken into consideration when determining values of the target status dimension for the heat map.

As another possibility, a filter parameter may specify one or more trades of interest for the heat map. For example, if the target status dimension is a construction budget status, the filter parameter may indicate that costs of actions and/or materials that are not associated with the one or more trades of interest are not to be taken into consideration when determining values of the target status dimension for the heat map. In another example, if the target status dimension is a material installation status, the filter parameter may indicate that materials that are not to associated with the one or more trades of interest are not to be taken into consideration when determining values of the target status dimension for the heat map.

As another possibility, a filter parameter may specify one or more types of risks of interest for the heat map. Many different types of risks could be specified. For example, one or more types of safety risks (e.g., fire hazards, etc.), schedule risks (e.g., risks that completion dates one or more tasks will be delayed), budget risks (e.g., that one or more tasks or change requests exceed or will exceed a planned budget), or other types of risks may be specified.

The filter parameters may also take other forms. Further, it will be appreciated that two or more filter parameters may be applied to a given request to generate a heat map. For example, a request to generate a heat map may be limited to a particular trade (e.g., electrical work) during a particular time range of interest (e.g., a four week period of time). As another example, filter parameters associated with a request to generate a heat map may specify that the heat map should display locations that are associated with one or more types of risks.

At block 312, the example pipeline functionality 300 may further proceed with the back-end computing platform 102 determining, for the first location entity, a first value for the target status dimension based on (i) the one or more feature values and (ii) the first relationship between the data asset and the first location entity. The functionality for determining the first value for the target status dimension may take various forms (e.g., as described above with respect to FIG. 2).

For instance, as one possibility, the target status dimension may match a given feature variable that is defined for the data asset and/or the first location entity. In this example, a given feature value selected from among the one or more feature values corresponds to the given feature variable such that the given feature value indicates the first value for the target status dimension. As another possibility, a machine-learning model configured to determine values of the target status dimension may determine the first value based on at least the one or more feature values and/or the first relationship.

The functionality for determining the first value for the target status dimension may also take other forms.

At block 314, the example pipeline functionality 300 may further proceed with the back-end computing platform 102 generating data indicating the heat map for the construction project, the heat map comprising a visual representation of the first location entity displayed in a first color along the color scale that represents the first value for the target status dimension. The color scale maps different possible values of the target status variable to respective colors and/or fill patterns. The data that indicates the heat map may take many forms.

For instance, the data indicating the heat map may comprise an image file of a 2D map (e.g., as a raster image) and respective hexadecimal (HEX) color codes (e.g., red, green, and blue (RBG) values; cyan, magenta, yellow, and key (CMYK) values; lightness, channel a, and channel b (LAB) values; hue, whiteness, and blackness (HWB) values; hue, saturation, and lightness (HSL) values; and/or hue, saturation, and brightness (HSB) values) for pixels in the image such that pixels corresponding to a location on the map that represents the location entity match the first value of the target status variable in accordance with the color scale.

As another possibility, the data indicating the heat map may comprise a scalable vector graphics (SVG) file that includes at least one SVG shape element to represent the location entity in the heat map and style attributes (e.g., a fill property and/or a stroke property) that match the first value of the target status variable in accordance with the color scale. The data that indicates the heat map may also take other forms.

As another possibility, the data indicating the heat map may comprise a 2D drawing associated with the project (e.g., an architectural drawing, a construction blueprint, a floor plan, a concept drawing, an elevation drawing, an electrical drawing, a structural drawing, a detail drawing, an installation drawing, a fire protection drawing, a site plan, a reflected ceiling plan, a mechanical drawing, an HVAC drawing, a foundation plan, and/or a landscape drawing, etc.) or an indication of the 2D drawing (e.g., a title of the 2D drawing, a file name of the 2D drawing, and/or a programming construct such as a hyperlink, reference, and/or a pointer to the 2D drawing). In addition, the data indicating the heat map may comprise a layer configured to overlay a 2D drawing (e.g., when the 2D drawing is displayed via a software tool). The layer may include HEX color codes for groups of pixels in the layer and/or SVG shape elements that are configured to overlay locations in the 2D drawing corresponding to location entities for which values of the target status dimension have been determined. The colors indicated by the HEX color codes and/or the style attributes of the SVG shape elements may indicate the values of the target status dimension for the location entities.

The data that indicates the heat map may also take other forms.

At block 316, the example pipeline functionality 300 may further proceed with the back-end computing platform 102 transmitting, to the second end-user device, the data indicating the heat map and thereby causing the heat map to be displayed via the second end-user device.

The manner in which transmitting the data indicating the heat map to the second end-user device causes the second end-user device to display the heat map may take various forms. For instance, in one example, the indication of the target status dimension and the request to generate the heat map may have been submitted via a client-side application executing locally at the second end-user device. The client-side application may be configured to render the heat map on a display screen associated with the second end-user device upon receiving the indication of the target status dimension and the request to generate the heat map that were transmitted to the second end-user device from the back-end computing platform 102.

Optionally, in some implementations, the second end-user device may display the heat map in an interactive fashion that allows the user to view additional information upon clicking on or mousing over a location entity shown in the heat map. For instance, in some implementations, when a user clicks on a particular location entity, an element such as a link, a dialog box, or a pop-up window may appear (e.g., to display informational data assets whose relationships with the data asset influenced the value of the target status dimension for the particular location element.

The manner in which transmitting the data indicating the heat map to the second end-user device causes the second end-user device to display the heat map may also take other forms.

In line with the discussion above, the foregoing functionality may be utilized to generate a heat map for a construction project based on a target status dimension and a color scale (e.g., that maps possible values of the target status dimension to respective colors and/or patterns) such that the color of a given location entity depicted in the heat map indicates a corresponding value of the target status dimension for the location entity.

Figure 4:
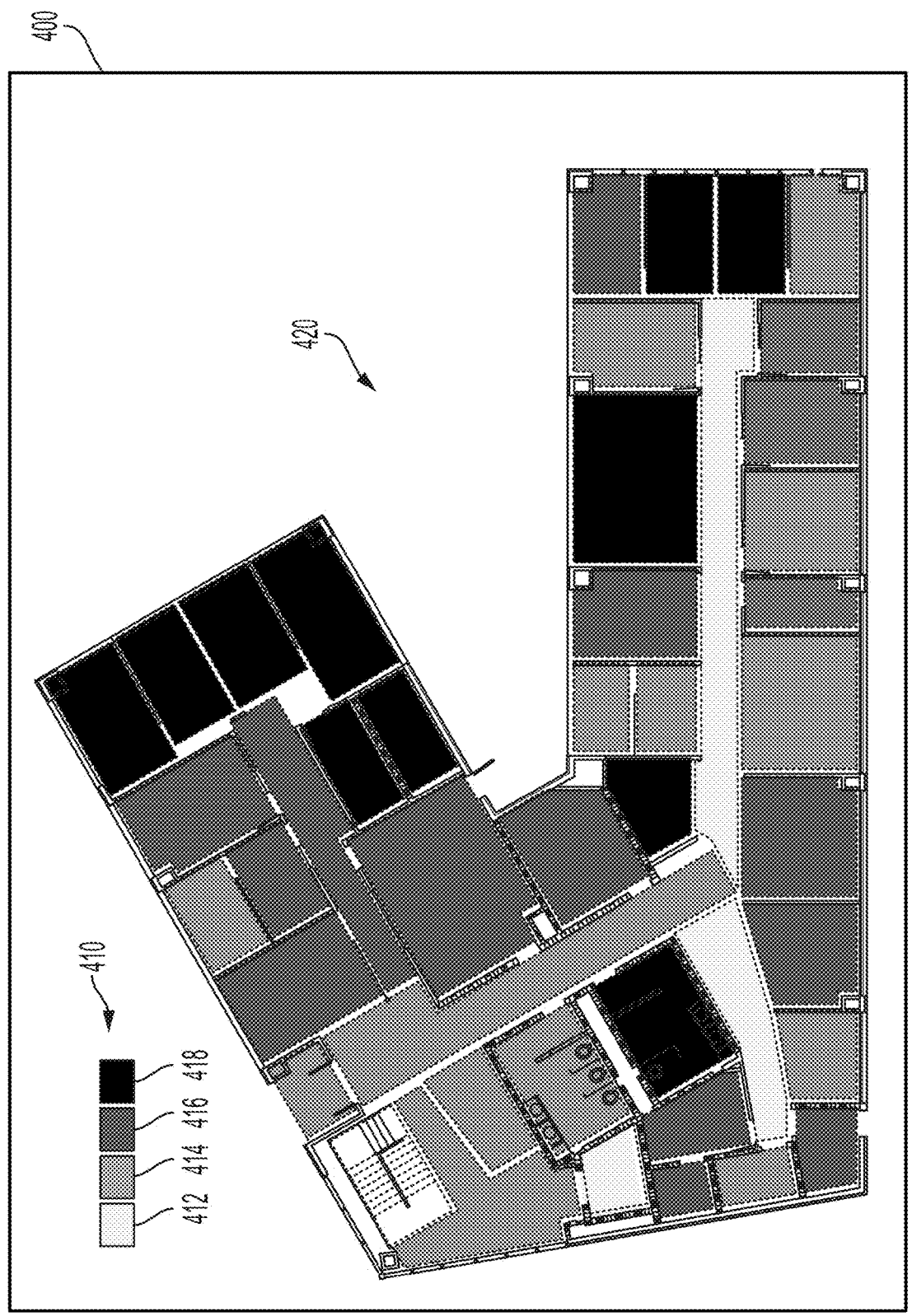
FIG. 4 depicts first example view of a graphical user interface that may be used to display a heat map for a construction project.

Turning now to FIG. 4, a first example view 400 that may be displayed at an end-user device (e.g., the client device 112 of FIG. 1 and/or the client device 700 of FIG. 7) is shown in accordance with the present disclosure. The view 400 may be displayed at the end-user device via a software tool for viewing such drawings. In some implementations, the software tool may be a stand-alone application running on the end-user device. In other implementations, the software tool may be included as a plug-in or similar component that is incorporated into a different software tool, such as an estimating tool or scheduling tool. In still other implementations, a software tool might not include a drawings visualization component at all.

As shown, the view 400 depicts a visualization of a 2D drawing for the construction project, where the 2D drawing is enriched with colors indicated by the color scale 410 to result in a heat map 420. The colors are used to color location entities (e.g., rooms and/or hallways) depicted in the heat map 420 such that values of a target status dimension for those location entities can be perceived quickly and comprehensibly in a visual form. For instance, in one scenario, suppose the target status dimension is a material installation status. For example, the heat map shown in FIG. 4 may indicate an installation status for a particular material, such as drywall. In this scenario, if the color 412 indicates that the construction material is located on the construction site, but installation has not yet started, a user viewing the heat map 420 may quickly perceive that the material installation has not started with respect to the location entities that are colored with the color 412. Similarly, if the color 414 indicates that installation of the material has begun, but is not yet complete, the user viewing the heat map 420 may quickly perceive that the material installation is in progress with respect to the location entities that are colored with the color 414. Further, if the color 416 indicates that installation of the material is complete, but not yet inspected and approved, the user viewing the heat map 420 may quickly perceive that the installation is complete with respect to the location entities that are colored with the color 416, but that final inspection and approved is still needed. Further still, if the color 418 indicates that the material is fully installed, inspected, and approved, the user viewing the heat map may quickly perceive that the installation work for the location entities colored with the color 418 is complete.

Figure 5:
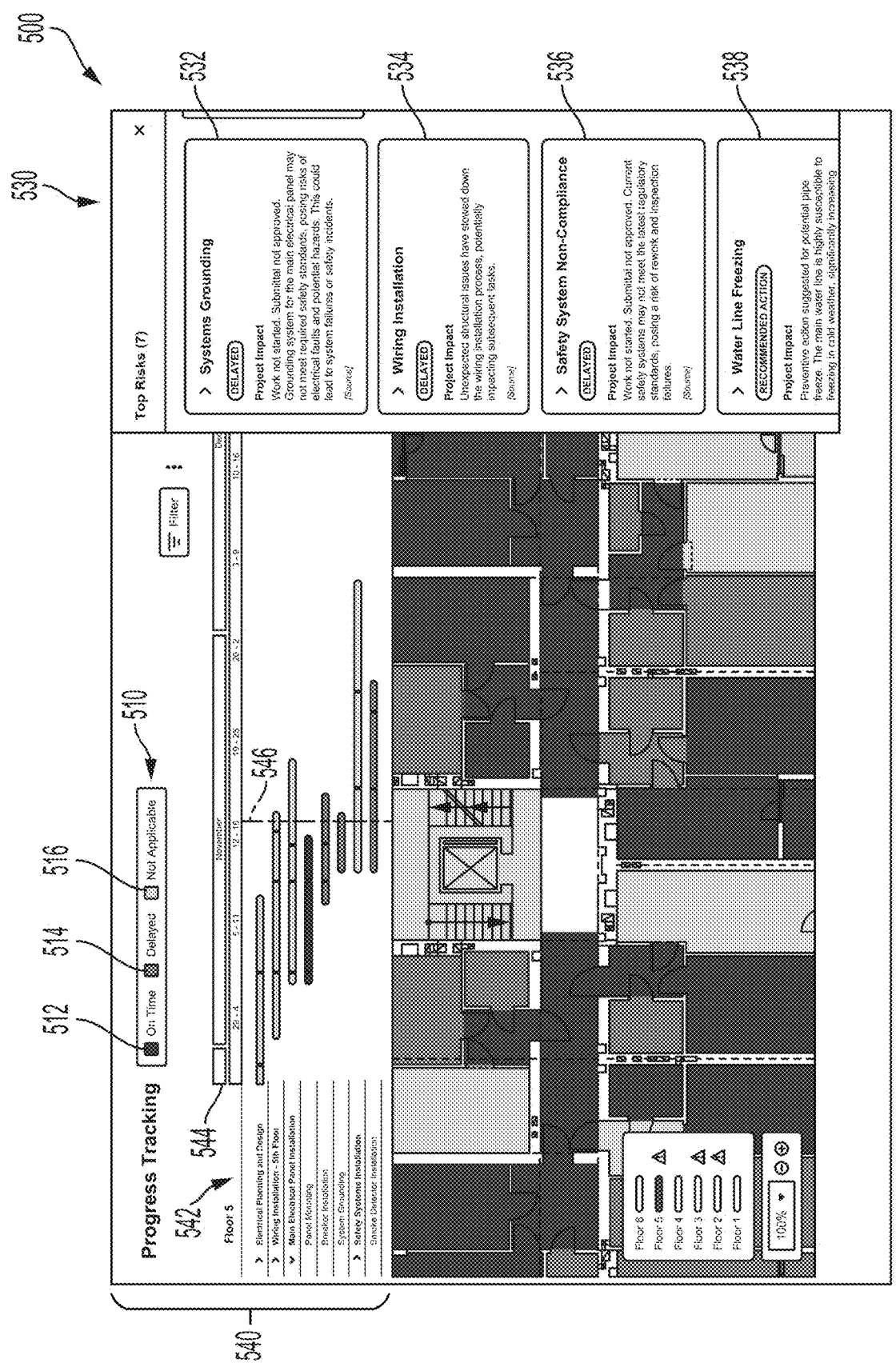
FIG. 5 depicts second example view of a graphical user interface that may be used to display a heat map for a construction project.

Turning now to FIG. 5, a second example view 500 that may be displayed at an end-user device (e.g., one of the client devices 112 of FIG. 1 and/or the client device 700 of FIG. 7) is shown in accordance with the present disclosure. Like the view 400 shown in FIG. 4, the view 500 may be displayed at the end-user device via a software tool for viewing such drawings.

As shown, the view 500 depicts a visualization of a 2D drawing for the construction project, where the 2D drawing is enriched with colors indicated by the color scale 510 to result in a heat map 520. In addition to the heat map 520, the view 500 depicts a sidebar 530 and a pane 540.

The fill patterns shown in the color scale 510 are used to color location entities (e.g., rooms and/or hallways) depicted in the heat map 520 such that values of a target status dimension for those location entities can be perceived quickly and comprehensibly in a visual form. In this example, the target status dimension is construction schedule status for tasks within the electrical trade.

As shown, the pane 540 includes a left column 542 in which categories and subcategories representing scheduled construction tasks within the electrical trade are listed. In addition, the pane 540 includes a timetable 544 with a series of date ranges and a vertical line 546 that indicates a current date. As shown, for each task listed in the column 542, the timetable 544 includes a respective timeline (e.g., where the left end of a respective time range for a given task represents a scheduled start date for the given task and the right end of the respective time range indicates a scheduled completion date for the given task).

FIG. 5 also includes a color scale indicating construction schedule status values for each location entity depicted in FIG. 5. In particular, a first color 512 indicates that the scheduled task listed in the pane 540 is "On Time," a second color 514 indicates that the scheduled task is "Delayed," and a third color 516 indicates that the scheduled task does not have an application construction status value (e.g., it is a description of a category of tasks, rather than an actual task itself). In the example view 500 shown in FIG. 5, various location entities (e.g., rooms, hallways) in the heat map 520 are shown in the first color 512, indicating that the construction status for tasks within the electrical trade are on time in those areas. In this regard, the value for the construction schedule status may be based, for each location entity shown in the heat map 520, on various different data assets that are both related to the location entity and related to the construction status for tasks in the electrical trade.

Similarly, various location entities (e.g., rooms, hallways) in the heat map 520 are shown in the second color 514, indicating that the construction status for tasks within the electrical trade are delayed in those areas. As above, the value for the construction schedule status may be based, for each location entity shown in the heat map 520, on various different data assets that are both related to the location entity and related to the construction status for tasks in the electrical trade. In particular, although one or more tasks within the electrical trade may be on time in these areas, one or more other tasks may be delayed. In this scenario, the view generator 230 may be configured to assign a value of Delayed to these particular location entities, reflecting the construction schedule status value that most requires a user's attention.

The pane 540 shown in FIG. 5 may provide additional information related to the heat map 520. For instance, within the construction tasks in the electrical trade listed in the panel 540, a timeline for the "Panel Mounting" task is shown in the first color 512, indicating that the Panel Mounting task is on time with respect to its scheduled timeline. Accordingly, a user may conclude that the Panel Mounting task is not contributing the delayed status in any of the areas that are reflected as delayed in the heat map 520. The pane 540 also includes a timeline for a "Breaker Installation" task, which is shown in the second color 514, indicating that the Breaker Installation task is delayed. Further, the timelines in the pane 540 also indicate that each of the tasks following Breaker Installation task are also delayed. From this information, a user may conclude that, for the areas shown in the heat map 520 that are shown as delayed, the Breaker Installation is the earliest scheduled task that may be contributing to the delay. Moreover, each of the location entities in the heat map 520 may be selectable by the user to obtain more detailed information.

The sidebar 530 depicts notifications 532, 534, 536, and 538 that may be presented to the user, alerting the user to potential risks (e.g., safety risks, budget risks, schedule risks, etc.) and/or recommended actions that may be taken to reduce potential risks that are identified. In some implementations, the notifications may relate to the information that is displayed in the heat map. As shown, the notification 532 indicates that there is a risk of electrical faults that could potentially cause system failure or safety incidents. The notification 532 further indicates that this risk results from the fact that the Systems Grounding task for the main electrical panel has been delayed, and thus the panel may not meet mandatory safety standards. In addition, the notification 534 indicates that the wiring installation process has been slowed and suggests that this delay poses the risk of impacting subsequent actions (e.g., tasks) for the construction project. In addition, the notification 536 indicates that, due to delays reflected in the heat map 520, safety systems may fail to meet mandatory safety standards and may therefore pose a risk of rework and inspection failures. Further, the notification 538 indicates a risk of a pipe freeze and also indicates a recommended action for resolving the risk.

Figure 6:
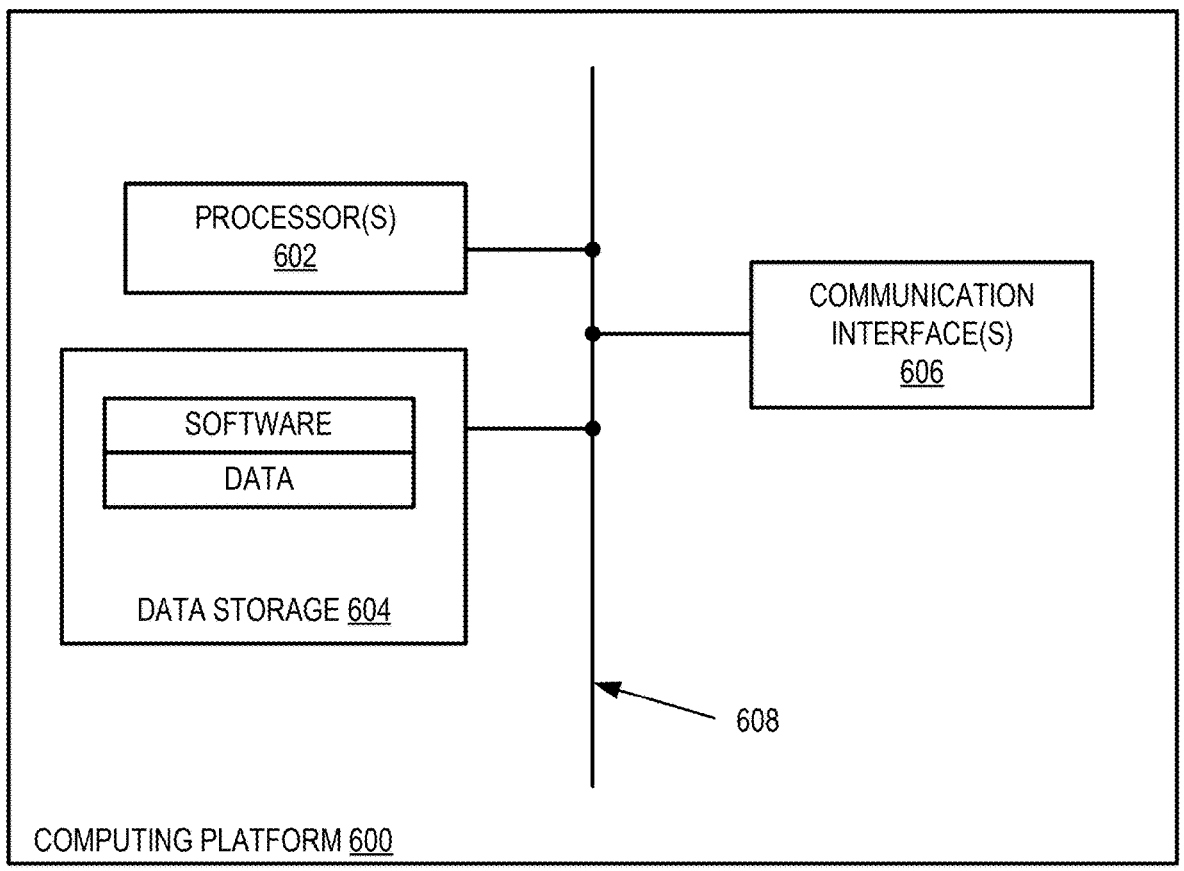
FIG. 6 is a simplified block diagram that illustrates some structural components that may be included in an example computing platform, according to the present disclosure.

Turning now to FIG. 6, a simplified block diagram is provided to illustrate some structural components that may be included in an example computing platform 600 that may be configured to perform the platform-side functions disclosed herein. At a high level, the example computing platform 600 may generally comprise any one or more computer systems (e.g., one or more servers) that collectively include one or more processors 602, data storage 604, and one or more communication interfaces 606, each of which may be communicatively linked by a communication link 608 that may take the form of a system bus, a communication network such as a public, private, or hybrid cloud, or some other connection mechanism. Each of these components may take various forms.

For instance, the one or more processors 602 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 602 could comprise processing components that are distributed across a plurality of physical computing devices connected via a network, such as a computing cluster of a public, private, or hybrid cloud.

In turn, the data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, the data storage 604 may be capable of storing both (i) program instructions that are executable by the one or more processors 602 such that the example computing platform 600 is configured to perform any of the various functions disclosed herein (including but not limited to any of the server-side functions discussed above), and (ii) data that may be received, derived, or otherwise stored by the example computing platform 600.

The one or more communication interfaces 606 may comprise one or more interfaces that facilitate communication between the example computing platform 600 and other systems or devices, where each such interface may be wired and/or wireless and may communicate according to any of various communication protocols. As examples, the one or more communication interfaces 606 may take include an Ethernet interface, a serial bus interface (e.g., Firewire, USB (Universal Serial Bus) 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 600 may additionally have an Input/Output (I/O) interface that includes or provides connectivity to I/O components that facilitate user interaction with the example computing platform 600, such as a keyboard, a mouse, a trackpad, a display screen, a touch-sensitive interface, a stylus, a virtual-reality headset, and/or one or more speaker components, among other possibilities.

It should be understood that the example computing platform 600 is one example of a computing platform that may be used with the examples described herein. Numerous other arrangements are possible and contemplated herein. For instance, in other examples, the example computing platform 600 may include additional components not pictured and/or more or less of the pictured components.

Figure 7:
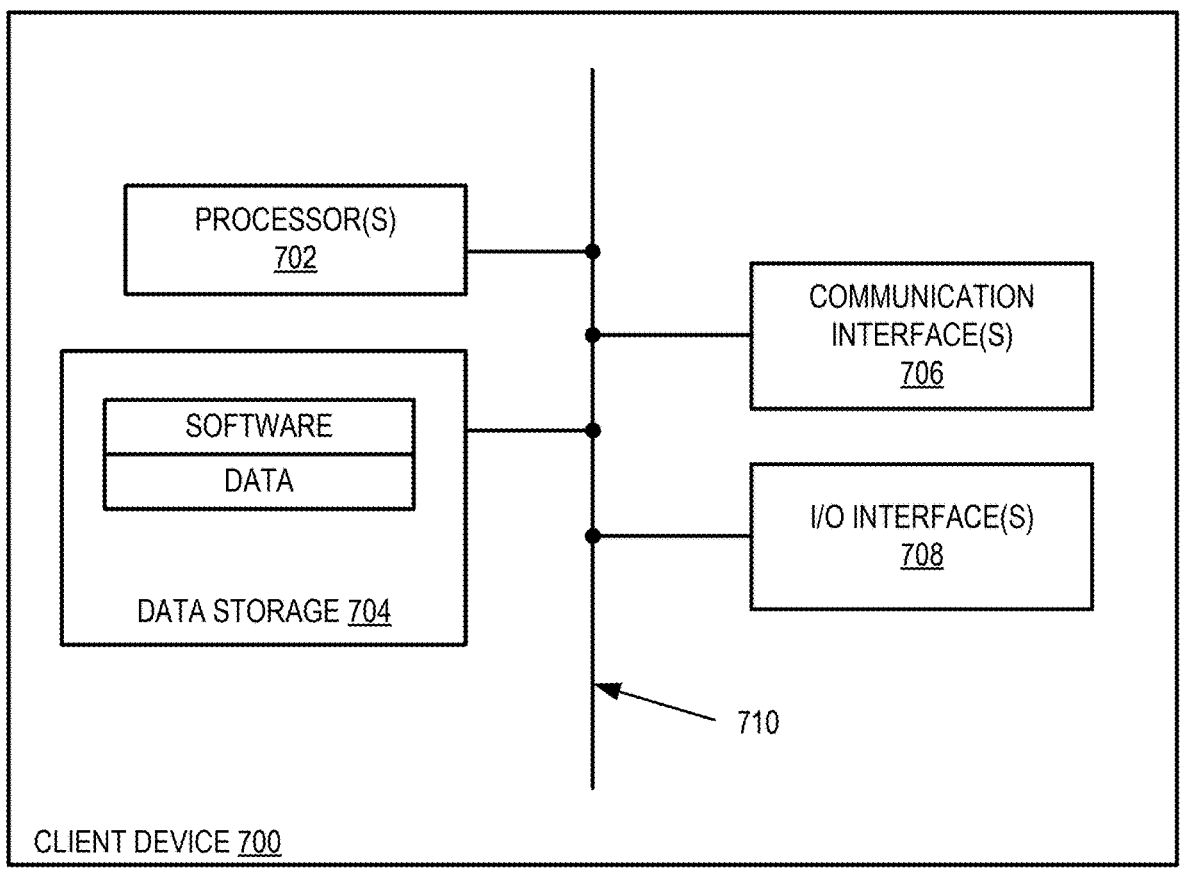
FIG. 7 is a simplified block diagram that illustrates some structural components that may be included in an example client device, according to the present disclosure.

Turning next to FIG. 7, a simplified block diagram is provided to illustrate some structural components that may be included in an example client device 700 that may be configured to perform some the client-side functions disclosed herein. At a high level, the example client device 700 may include one or more processors 702, data storage 704, one or more communication interfaces 706, and an I/O interface 708, each of which may be communicatively linked by a communication link 710 that may take the form a system bus and/or some other connection mechanism. Each of these components may take various forms.

For instance, the one or more processors 702 of the example client device 700 may comprise one or more processor components, such as one or more CPUs, GPUs, ASICs, DSPs, and/or programmable logic devices such as FPGAs, among other possible types of processing components.

In turn, the data storage 704 of the example client device 700 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 7, the data storage 704 may be capable of storing both (i) program instructions that are executable by the one or more processors 702 of the example client device 700 such that the example client device 700 is configured to perform any of the various functions disclosed herein (including but not limited to any of the client-side functions discussed above), and (ii) data that may be received, derived, or otherwise stored by the example client device 700.

The one or more communication interfaces 706 may comprise one or more interfaces that facilitate communication between the example client device 700 and other systems or devices, where each such interface may be wired and/or wireless and may communicate according to any of various communication protocols. As examples, the one or more communication interfaces 706 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 708 may generally take the form of (i) one or more input interfaces that are configured to receive and/or capture information at the example client device 700 and (ii) one or more output interfaces that are configured to output information from the example client device 700 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 708 may include or provide connectivity to output components such as a display screen and/or an audio speaker, among other possibilities.

It should be understood that the example client device 700 is one example of a client device that may be used with the examples described herein. Numerous other arrangements are possible and contemplated herein. For instance, in other examples, the example client device 700 may include additional components not pictured and/or more or fewer of the pictured components.

Examples of the disclosed innovations have been described above. Those skilled in the art will understand, however, that changes and modifications may be made to the examples described without departing from the true scope and spirit of the present invention, which will be defined by the claims.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:

1. A computing platform comprising:
at least one communication interface;
at least one processor;
at least one non-transitory computer-readable medium; and
program instructions stored on the at least one non-transitory computer-readable medium that, when executed by the at least one processor, cause the computing platform to:
receive, from a first end-user device, a data asset related to a construction project;
extract, from the data asset, one or more feature values for one or more respective feature variables;

determine, via a first machine-learning model based on the one or more feature values, (i) a first relationship between the data asset and a first location entity associated with the construction project and (ii) a second relationship between the data asset and a second location entity associated with the construction project;

update the data asset to include j an indication of the first relationship between the data asset and the first location entity and (ii) an indication of the second relationship between the data asset and the second location entity;

receive, from a second end-user device, (i) an indication of a target status dimension and (ii) a request to generate a heat map for the construction project that represents values for the target status dimension along a color scale;

determine, for the first location entity, a first value for the target status dimension based on (i) the one or more feature values and (ii) the first relationship between the data asset and the first location entity;

determine, for the second location entity, a second value for the target status dimension based on (i) the one or more feature values and (ii) the second relationship between the data asset and the second location entity;

generate data indicating the heat map for the construction project, the heat map comprising (i) a visual representation of the first location entity displayed in a first color along the color scale that represents the first value for the target status dimension and (ii) a visual representation of the second location entity displayed in a second color along the color scale; and transmit, to the second end-user device, the data indicating the heat map and thereby cause the heat map to be displayed via the second end-user device.

2. The computing platform of claim 1, wherein the program instructions, when executed by the at least one processor, further cause the computing platform to:

determine, based on a position of the first location entity within a hierarchical taxonomy of location entities associated with the construction project, that the first location entity is located within a third location entity associated with the construction project;

based on determining that the first location entity is located within the third location entity, determine a third relationship between the data asset and the third location entity; and update the data asset to include an indication of the third relationship between the data asset and the third location entity.

3. The computing platform of claim 1, wherein the data asset is a first data asset, and wherein determining, for the first location entity, the first value for the target status dimension comprises:

determine, for the first location entity, the first value for the target status dimension based on an association between the first data asset and a second data asset.

4. The computing platform of claim 3, wherein the first data asset is a daily activity log indicating an installation status of a given material, wherein the target status dimension is a construction schedule status, wherein the first location entity is a given room that includes the given material, wherein the second data asset is a construction schedule indicating a scheduled installation date of the given material, and wherein the first value for the target status dimension indicates whether installation of the given material in the given room is on schedule.

5. The computing platform of claim 1, wherein the program instructions, when executed by the at least one processor, further cause the computing platform to:

identify, based the first value for the target status dimension, at least one of a schedule risk or a budget risk related to the construction project;

generate a notification indicating the schedule risk or budget risk; and transmit, to the second end-user device, the notification and thereby causing the notification to be displayed via the second end-user device.

6. The computing platform of claim 1, wherein the program instructions, when executed by the at least one processor, further cause the computing platform to:

determine, via a second machine-learning model, a recommended action to be taken based on the first value for the target status dimension;

generate a notification indicating the recommended action; and transmit, to the second end-user device, the notification and thereby causing the notification to be displayed via the second end-user device.

7. The computing platform of claim 1, wherein the data asset is an informational data asset comprising: a request for information (RFI), a punch list, a daily log, a change order, an inspection report, a budget, or a schedule for the construction project.

8. A non-transitory computer-readable medium, wherein the non-transitory computer-readable medium is provisioned with program instructions that, when executed by at least one processor, cause a computing platform to:

receive, from a first end-user device, a data asset related to a construction project;

extract, from the data asset, one or more feature values for one or more respective feature variables;

determine, via a first machine-learning model based on the one or more feature values, (i) a first relationship between the data asset and a first location entity associated with the construction project and (ii) a second relationship between the data asset and a second location entity associated with the construction project;

update the data asset to include (i) an indication of the first relationship between the data asset and the first location entity and (ii) an indication of the second relationship between the data asset and the second location entity;

receive, from a second end-user device, (i) an indication of a target status dimension and (ii) a request to generate a heat map for the construction project that represents values for the target status dimension along a color scale;

determine, for the first location entity, a first value for the target status dimension based on (i) the one or more feature values and (ii) the first relationship between the data asset and the first location entity;

determine, for the second location entity, a second value for the target status dimension based on (i) the one or more feature values and (ii) the second relationship between the data asset and the second location entity:

generate data indicating the heat map for the construction project, the heat map comprising (i) a visual representation of the first location entity displayed in a first color along the color scale that represents the first value for the target status dimension and (ii) a visual representation of the second location entity displayed in a second color along the color scale; and transmit, to the second end-user device, the data indicating the heat map and thereby cause the heat map to be displayed via the second end-user device.

9. The non-transitory computer-readable medium of claim 8, wherein the program instructions, when executed by the at least one processor, further cause the computing platform to:
determine, based on a position of the first location entity within a hierarchical taxonomy of location entities associated with the construction project, that the first location entity is located within a third location entity associated with the construction project;
based on determining that the first location entity is located within the third location entity, determine a third relationship between the data asset and the third location entity; and
update the data asset to include an indication of the third relationship between the data asset and the third location entity.

10. The non-transitory computer-readable medium of claim 8, wherein the data asset is a first data asset, and wherein determining, for the first location entity, the first value for the target status dimension comprises:
determine, for the first location entity, the first value for the target status dimension based on an association between the first data asset and a second data asset.

11. The non-transitory computer-readable medium of claim 10, wherein the first data asset is a daily activity log indicating an installation status of a given material, wherein the target status dimension is a construction schedule status, wherein the first location entity is a given room that includes the given material, wherein the second data asset is a construction schedule indicating a scheduled installation date of the given material, and wherein the first value for the target status dimension indicates whether installation of the given material in the given room is on schedule.

12. The non-transitory computer-readable medium of claim 8, wherein the program instructions, when executed by the at least one processor, further cause the computing platform to:
identify, based the first value for the target status dimension, at least one of a schedule risk or a budget risk related to the construction project;
generate a notification indicating the schedule risk or budget risk; and
transmit, to the second end-user device, the notification and thereby causing the notification to be displayed via the second end-user device.

13. The non-transitory computer-readable medium of claim 8, wherein the program instructions, when executed by the at least one processor, further cause the computing platform to:
determine, via a second machine-learning model, a recommended action to be taken based on the first value for the target status dimension;
generate a notification indicating the recommended action; and
transmit, to the second end-user device, the notification and thereby causing the notification to be displayed via the second end-user device.

14. The non-transitory computer-readable medium of claim 8, wherein the data asset is an informational data asset comprising: a request for information (RFI), a punch list, a daily log, a change order, an inspection report, a budget, or a schedule for the construction project.

15. A method carried out by a computing platform, the method comprising:
receiving, from a first end-user device, a data asset related to a construction project;
extracting, from the data asset, one or more feature values for one or more respective feature variables;
determining, via a first machine-learning model based on the one or more feature values, (i) a first relationship between the data asset and a first location entity associated with the construction project and (ii) a second relationship between the data asset and a second location entity associated with the construction project;
updating the data asset to include (i) an indication of the first relationship between the data asset and the first location entity and (ii) an indication of the second relationship between the data asset and the second location entity;
receiving, from a second end-user device, (i) an indication of a target status dimension and (ii) a request to generate a heat map for the construction project that represents values for the target status dimension along a color scale;
determining, for the first location entity, a first value for the target status dimension based on (i) the one or more feature values and (ii) the first relationship between the data asset and the first location entity;
determine, for the second location entity, a second value for the target status dimension based on (i) the one or more feature values and (ii) the second relationship between the data asset and the second location entity;
generate data indicating the heat map for the construction project, the heat map comprising (i) a visual representation of the first location entity displayed in a first color along the color scale that represents the first value for the target status dimension and (ii) a visual representation of the second location entity displayed in a second color along the color scale; and
transmitting, to the second end-user device, the data indicating the heat map and thereby causing the heat map to be displayed via the second end-user device.

16. The method of claim 15, further comprising:
determining, based on a position of the first location entity within a hierarchical taxonomy of location entities associated with the construction project, that the first location entity is located within a third location entity associated with the construction project;
based on determining that the first location entity is located within the third location entity, determining a third relationship between the data asset and the third location entity; and
updating the data asset to include an indication of the third relationship between the data asset and the third location entity.

17. The method of claim 15, wherein the data asset is a first data asset, and wherein determining, for the first location entity, the first value for the target status dimension comprises:
determining, for the first location entity, the first value for the target status dimension based on an association between the first data asset and a second data asset.

* * * * *